(12) United States Patent
Hinton

(10) Patent No.: US 6,942,053 B2
(45) Date of Patent: Sep. 13, 2005

(54) VEHICLE OF NOVEL CONFIGURATION AND OPERATION

(76) Inventor: Golden S. Hinton, 484 W. Cloverhurst Ave., Athens, GA (US) 30606

( * ) Notice: Subject to any disclaimer, the term of this patent is extended or adjusted under 35 U.S.C. 154(b) by 112 days.

(21) Appl. No.: 10/642,317

(22) Filed: Aug. 15, 2003

(65) Prior Publication Data

US 2005/0035583 A1 Feb. 17, 2005

(51) Int. Cl.⁷ .......................... B62D 61/12; B62H 1/12; B62J 17/00
(52) U.S. Cl. ..................... 180/209; 280/293; 280/755; 296/78.1
(58) Field of Search .................. 180/21, 209; 280/293, 280/298, 86.5, 301, 763.1, 764.1, 765.1, 766.1, 748, 755, 767, 47, 43, 43.1, 43.17, 43.23; 296/1.04, 155, 78.1, 79

(56) References Cited

U.S. PATENT DOCUMENTS

| | | | | |
|---|---|---|---|---|
| 2,589,023 A | * | 3/1952 | Pattner | 280/301 |
| 3,700,059 A | * | 10/1972 | Sutton | 180/209 |
| 3,980,150 A | * | 9/1976 | Gigli | 180/209 |
| 4,313,511 A | * | 2/1982 | Soo Hoo | 180/21 |
| 4,513,837 A | * | 4/1985 | Archer | 180/209 |
| 4,826,194 A | * | 5/1989 | Sakita | 285/302 |
| 5,029,894 A | | 7/1991 | Willman | |
| 5,048,864 A | * | 9/1991 | Geiger | 280/755 |
| 5,181,740 A | * | 1/1993 | Horn | 280/755 |
| 5,257,671 A | * | 11/1993 | Watkins | 180/209 |
| 5,401,055 A | * | 3/1995 | Pham | 280/755 |
| 5,685,388 A | * | 11/1997 | Bothwell et al. | 180/219 |
| 5,791,718 A | * | 8/1998 | Boutin | 296/78.1 |
| 6,017,076 A | * | 1/2000 | Belisle | 296/78.1 |
| 6,170,847 B1 | * | 1/2001 | Pham | 280/298 |
| 6,213,237 B1 | * | 4/2001 | Willman | 180/209 |
| 6,276,745 B1 | * | 8/2001 | Wilson | 296/155 |
| 6,637,763 B2 | * | 10/2003 | Kuo | 280/209 |
| 6,685,208 B1 | * | 2/2004 | Cowie | 280/293 |
| 6,845,999 B2 | * | 1/2005 | Royal et al. | 280/304 |

FOREIGN PATENT DOCUMENTS

| | | | | |
|---|---|---|---|---|
| CH | 656588 | | 7/1986 | |
| CH | 659977 | | 3/1987 | |
| EP | 0097623 | | 1/1984 | |
| FR | 2678230 A1 | * | 12/1992 | ............ B62H/1/10 |
| GB | 2104464 A | | 3/1983 | |
| JP | 05254404 A | * | 10/1993 | ............ B60T/1/16 |
| WO | WO 2004014716 | | 2/2004 | |

OTHER PUBLICATIONS

Sparrow, David & Andrea, "Motor Scooters Colour Family Album", Veloce Publishing PLC, p. 10.

* cited by examiner

*Primary Examiner*—Paul N. Dickson
*Assistant Examiner*—Laura B. Rosenberg
(74) *Attorney, Agent, or Firm*—Technoprop Colton LLC

(57) ABSTRACT

A vehicle having two primary wheels and two or more retractable wheels that may be operated in either two-wheeled or multi-wheeled configuration with a sliding panel system for open or complete enclosure, with both the wheelprint and the open/enclosed panel system being quickly and independently operated.

53 Claims, 14 Drawing Sheets

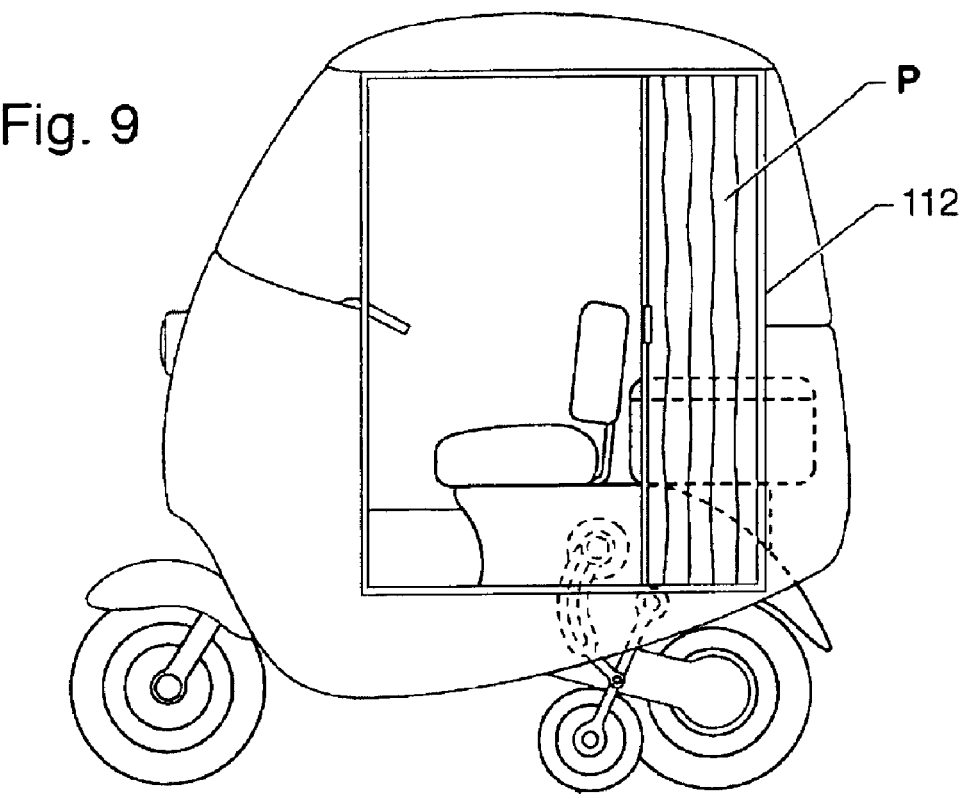
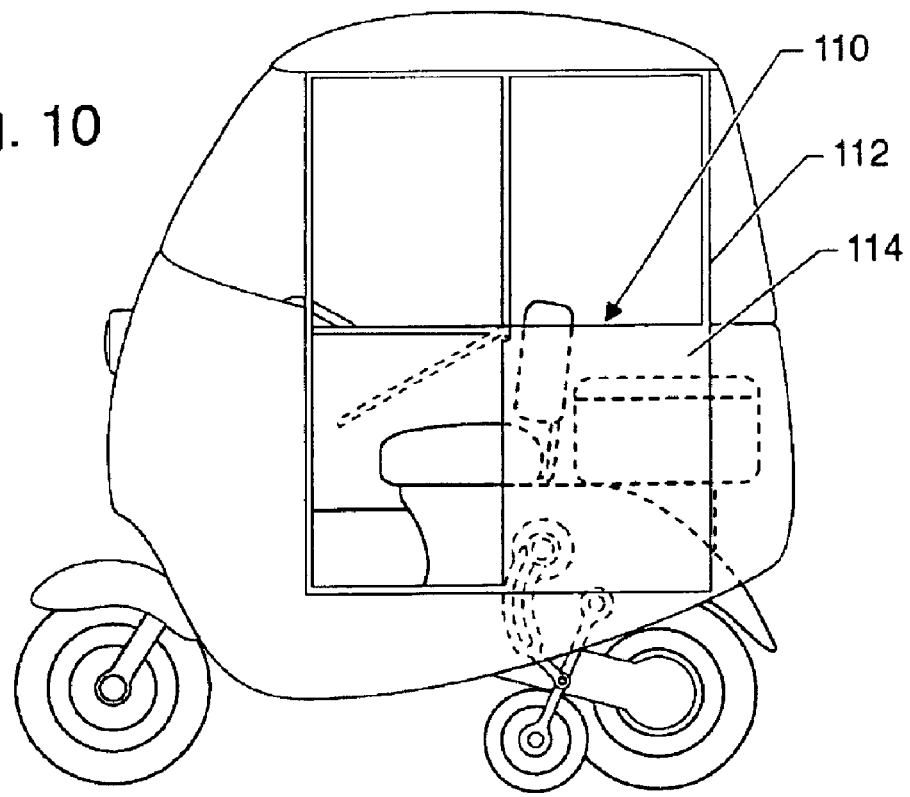

VEHICLE OF NOVEL CONFIGURATION AND OPERATION

BACKGROUND OF THE INVENTION

1. Field of the Invention

This invention generally relates to a basic two-wheeled or multi-wheeled vehicle such as a motorscooter or motorcycle that is enclosable to protect riders and their cargo and has at least two additional, retractable wheels to add low-speed, stopping and cornering stability and a higher level of safety to the vehicle. This invention more specifically relates to a two-wheeled or multi-wheeled vehicle fitted with an enclosure to protect the rider or riders and their cargo from outside effects such as weather and road debris, and equipped with retractable stabilizing wheels to prevent the vehicle from becoming tipping over while cornering, being driven at slower speeds, and stopped.

2. Prior Art

There are a large number of two-wheeled vehicles, both engine powered such as motorcycles, motorscooters, and mopeds and human powered such as bicycles and rickshaws, available today. With the ever-present dichotomy of increasing petroleum prices and increasing urban density, as well as a human desire to travel the open roads, motorcycles and especially motorscooters and mopeds likely will increase in popularity as the vehicle of choice for personal, professional, business and military applications. While these vehicles have been available for many years, in light of this invention, they have several disadvantages. For example, traditional two-wheeled vehicles can be dangerous to operate, are open to inclement weather and injurious agents of all kinds, are irritatingly noisy to many, and are unsuitable for luggage, bags of groceries, laundry, packages and other commonly transported items.

One disadvantage of traditional two-wheeled vehicles is that they require a certain amount of dexterity and more skill for safe and convenient operation. For example, a rider who is not careful can cause the two-wheeled vehicle to tip over. Another related disadvantage is that a rider who does not stop correctly, for example by placing their leg outward too early or not at all to stabilize the stopped or slowing vehicle, could suffer excessive amounts of wear or an injury to his or her knees and joints, let alone damage the vehicle when it tips over. These disadvantages are magnified during stop and go traffic. Therefore, there is a need for a device or mechanism to help prevent a two-wheeled vehicle from tipping over as it slows or corners and when it is stopped.

Another disadvantage of traditional two-wheeled vehicles is that they typically are open to the air and provide the rider with very little protection against the outside environment. For example, these vehicles provide little or no protection from noise and exhaust pollution, from debris thrown up from the road, or from the weather. Moreover, such vehicles provide little or no protection in the event of an accident or from intentional harm, such as the throwing of rocks at or the discharge of a firearm toward the rider. Therefore, there is a need for a device or mechanism to help protect riders and their cargo from outside elements and interferences.

With all these disadvantages, the present invention is long overdue. There is a need for a vehicle that is safe to operate, whisper quiet, enclosable, and economical while at the same time takes up a minimal amount of road and parking space. There also is a need for a vehicle that can transport one or two persons and their cargo that is simple and convenient to get on and off, that is easy to park, and that is relatively noncomplex and aesthetically pleasing. For example, there is a great need for a vehicle that is adaptable to specific tasks such as for use as a personal transportation device, for use in the delivery of small packages for businesses, including a bullet-resistant enclosure for police and military use, and many other general and specialized functions. The unique vehicle disclosed in this specification satisfies these needs and more and is poised to become the next and greatest vehicle of choice to everyone.

BRIEF SUMMARY OF THE INVENTION

Two-wheeled vehicles such as motorcycles, motorscooters, mopeds, and bicycles require riders to use their feet to keep the vehicle upright when the vehicle slows down, comes to a stop, and sometimes when turning a corner slowly. If the vehicle is completely enclosed, the rider's feet cannot be so used, yet complete enclosure of the vehicle has many advantages.

To obtain these advantages, retractable wheels are provided for in this invention that will outstretch quickly whenever the rider wishes to deploy them. Additionally, a complete sliding panel enclosure system has been provided to quickly open and close window panels and door panels. Thus, a two-wheeled vehicle can be quickly converted to a multi-wheeled vehicle and vice versa. These conversions are independent of each other enhancing the vehicle's versatility and usefulness.

This invention allows a two-wheeled vehicle to be quickly converted to a multi-wheeled vehicle and vice versa and an open two-wheeled vehicle to be quickly converted to a completely enclosed vehicle and vice versa. The conversions are independent of each other, as the rider may elect. Additionally, the rider can opt to operate the vehicle with the retractable wheels in their extended position for added safety, especially when operation of the vehicle will be continuously at speeds slower than about 30 miles per hour (50 kph). Further, the enclosure helps prevent the rider from becoming and looking windswept and, especially with a safety/utility bar, may obviate the need for a helmet.

These improvements and other features of this invention will become readily apparent to those of ordinary skill in the art when the following detailed description of the preferred embodiments is read in conjunction with the accompanying drawings in which like reference numerals represent like components throughout the views.

BRIEF DESCRIPTION OF THE DRAWINGS

FIG. 9 is a side view of the vehicle shown in FIG. 2 illustrating a first exemplary means for entering and exiting the vehicle enclosure.

FIG. 10 is a side view of the vehicle shown in FIG. 2 illustrating a second exemplary means for entering and exiting the vehicle enclosure.

DETAILED DESCRIPTION OF THE PREFERRED EMBODIMENTS

Figure 1:
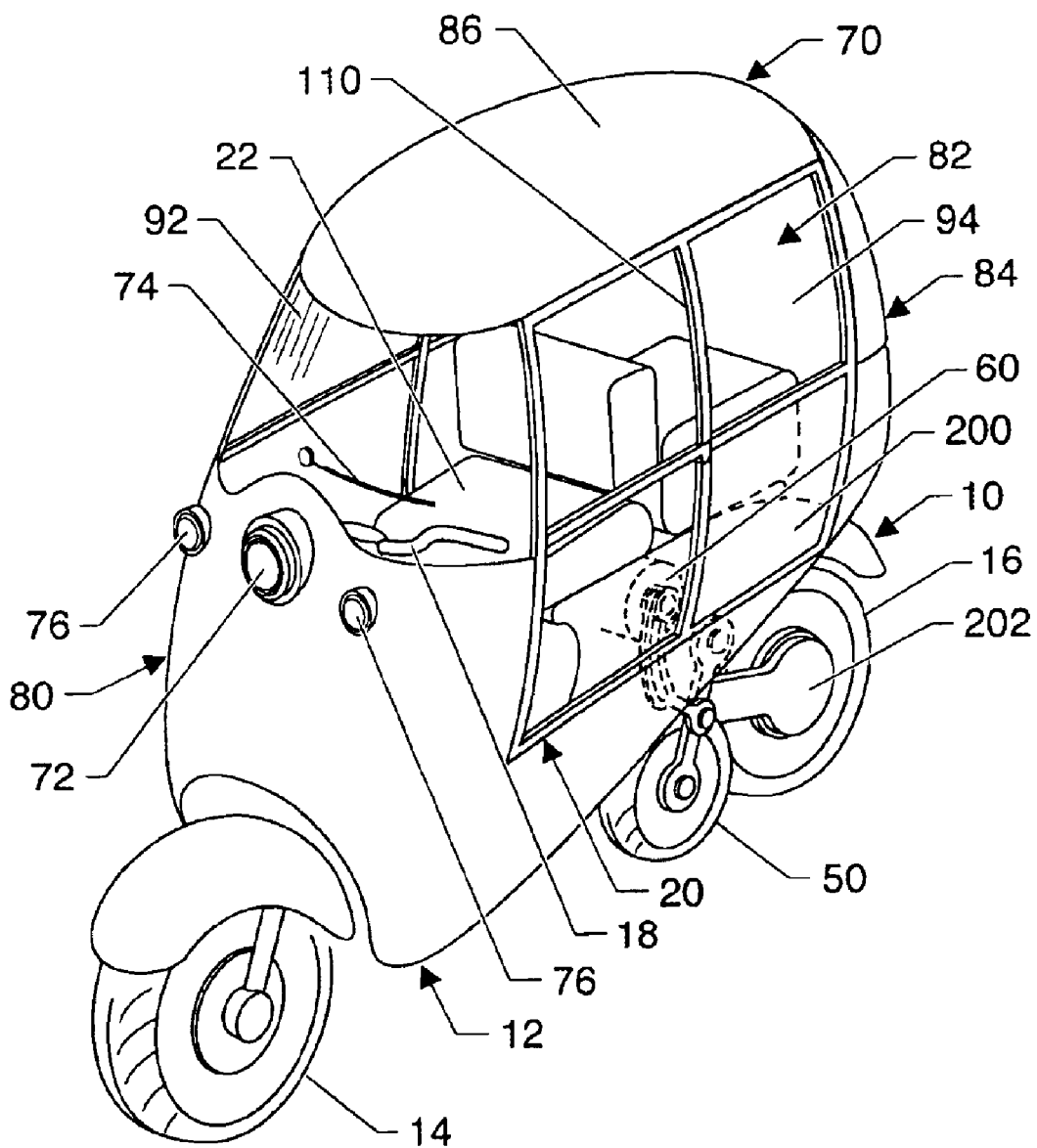
FIG. 1 is a perspective view of a vehicle in accordance with this invention.

This invention in its preferred form is a unique safe and comfortable two-wheeled vehicle with retractable wheels for stabilizing the vehicle at selective times and/or speeds and preventing the vehicle from tipping over when moving slowly, stopped or cornering and with an enclosure structure for enclosing and protecting riders and their belongings. The retractable wheels provide a means for stabilizing the vehicle at lower speeds, while stopped, and while cornering, if desired, and retract at normal operating speeds. The enclosure structure provides both safety for the riders and their belongings and protection from inclement weather and the road along with a unique variable opening means for entering and exiting the enclosure.

The basic two-wheeled vehicle can be of the type known in the art. As such, this invention can be a retrofit to an existing vehicle or can be built onto the vehicle at the time of manufacture as an original equipment option or accessory. Motorscooters and motorcycles, mopeds and motorized bicycles, and conventional bicycles can benefit from this invention. For example, the basic vehicle assembly of this invention can include a frame, a drive wheel or driving device, and a steering assembly including a handlebar, a fork, a head tube and the front wheel. A preferred embodiment of this invention comprises this basic vehicle assembly, one or more retractable wheels and the enclosure assembly.

A retractable wheel preferably is located on each side of the vehicle typically proximal to the rear axle of the vehicle, where they can provide a greater combination of safety and convenient placement so as to prevent the vehicle from tipping when extended, yet not adversely impair the operation of the vehicle or the movement of the rider. The retractable wheels reversibly move from an upper retracted position distal from the road to a lower extended position proximal to the road and when retracted can be located inside of or outside of the enclosure structure depending on the enclosure structure selected. The retractable wheels can be operated either manually or automatically and can be designed to extend to prevent the vehicle from tipping at slower speeds, while stopped or while cornering, and to retract when less necessary at higher speeds.

The enclosure generally is a rigid outer casing that is positioned around the riding area of the vehicle. The enclosure is mounted securely on the main frame of the vehicle. The front steering wheel and the rear driving wheel of the typical vehicle remain exposed by extending outwardly of the enclosure. The enclosure includes windows and a means for entering and exiting the enclosure, each of which preferably can be opened and closed in varying arrays. The enclosure can include safety devices such as roll bars, safety bars, utility bars, and safety belts, and convenience and luxury options such as headlights and window wipers, storage bins or compartments, audio/video systems, climate control systems, and the like.

The base vehicle of this invention can be any conventional two-wheeled vehicle, and preferably a powered vehicle such as a motorscooter, motorcycle, moped, or motorized bicycle. For ease of disclosure herein, the following description of the preferred embodiments and the figures will use a motorscooter as an exemplary embodiment. However, it should be kept in mind that a motorscooter is simply an exemplary embodiment and the invention is not limited to motorscooters. Thus, as used herein, the term two-wheeled vehicle refers to any vehicle that has at least two wheels on the road surface at all times in a normal operating mode.

Enclosure

Figure 2:
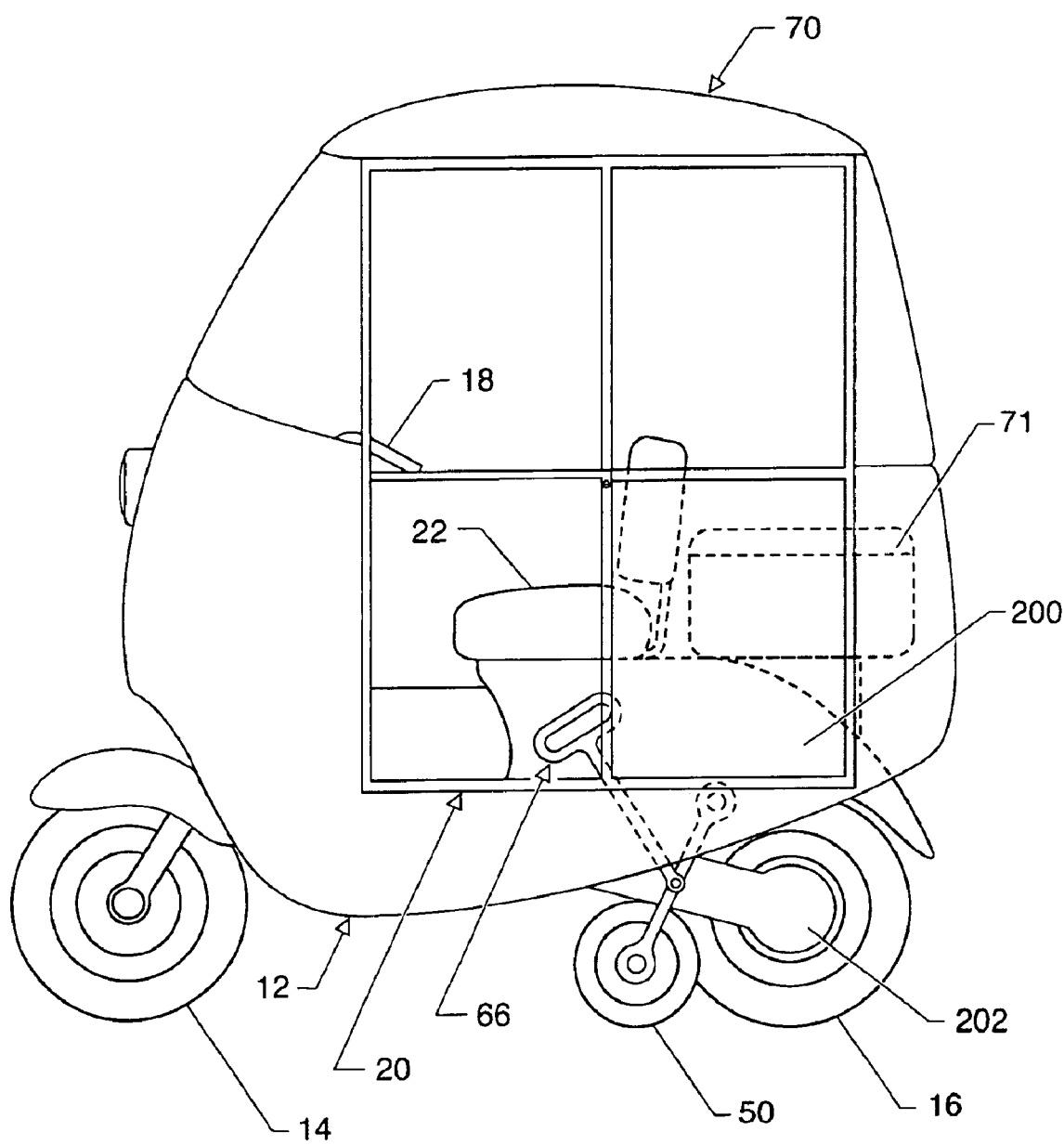
FIG. 2 is a side view of the vehicle shown in FIG. 1.

Referring to FIGS. 1 and 2, an exemplary vehicle 10 generally comprises the typical components of a two-wheeled vehicle, such as frame 12, front wheel 14, rear wheel 16, handlebar and steering assembly 18, brake and gas input/accelerator controls (not shown), foot rests or floor 20, and seat 22. To this vehicle 10, a retractable wheels 50 and enclosure 70 are added according to preferred embodiments of the invention. Both retractable wheels 50 and enclosure 70 are attached to vehicle 10 at appropriate positions on frame 12. As will become evident herein, the actual attachment means and mechanisms are within the skill level of those of ordinary skill in the art, and various means and mechanisms for attaching and activating (a motor 60 as shown in FIG. 1, and a pull handle 66 as shown in FIG. 2)

retractable wheels 50 and attaching enclosure 70 to vehicle 10 are contemplated and are not limited to the illustrative embodiments that may be disclosed herein or shown in the figures.

Figures 3, 4:
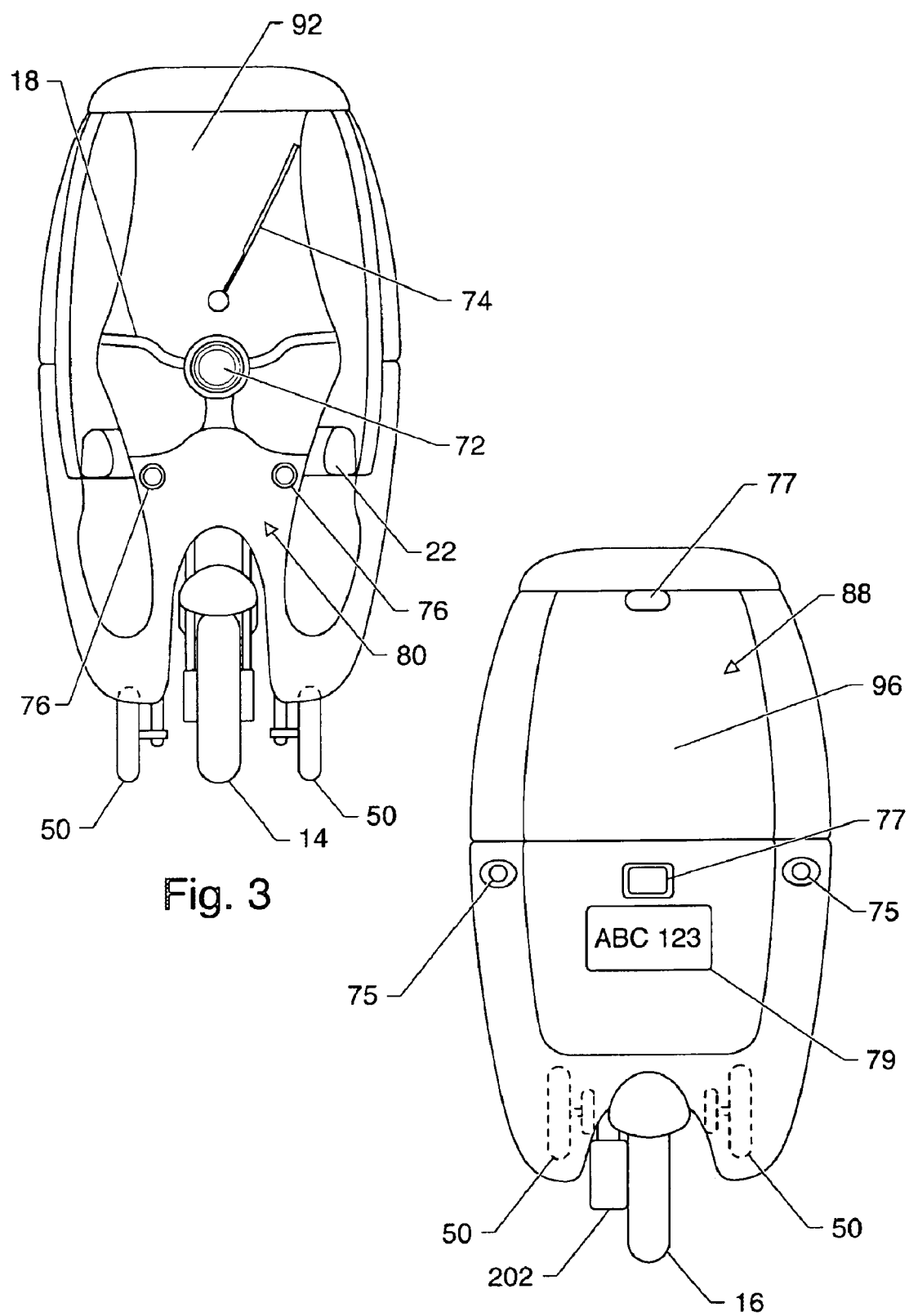
FIG. 3 is a front view of the vehicle shown in FIG. 1.
FIG. 4 is a rear view of the vehicle shown in FIG. 1.

Referring to FIGS. 1–5, enclosure 70 is mounted upon frame 12 of vehicle 10 and provides a surrounding structure that protects rider R and cargo from varying elements such as the weather, road debris, noise, the environment, and/or intentionally or unintentionally aimed projectiles or other items. Further, enclosure 70 can have a headlight 72 (as shown in FIGS. 1 and 2) or allow for a headlight 72 on the base vehicle 10 to shine or protrude through enclosure 70 (as shown in FIG. 3), windows, one or more of which can be openable, and windshield wiper 74. Preferably, enclosure 70 has front window or windshield 92, side windows 94, and back window 96. Therefore, rider R can see through enclosure 70. Further, enclosure 70 can have a means for entering and exiting 110 enclosure 70, such as shown in FIGS. 9–21 and described in more detail below.

In more detail, enclosure 70 generally comprises a front wall 80, two side walls 82, a rear wall 84 and a top wall or roof 86 interconnected into a preferably unitary whole structure. The various walls 80, 82, 84, 86 and other components of enclosure 70 can be connected together using any technique, including but not limited to conventional techniques such as welding, fasteners and adhesives. It is preferable that the various walls 80, 82, 84, 86 and other components of enclosure 70 be connected together securely to minimize the possibility of separation. Various additional safety features such as support ribs, roll bars, safety bars, utility bars, airbags, and the like can be added as desired.

Enclosure 70 may be affixed to frame 12 using any conventional attachment means such as welding, fasteners and adhesives. For example, lower edges of side walls 82 and possibly lower edges of front wall 80 and/or lower edges of rear wall 84 can be attached to a suitable portion of frame 12. Alternatively, additions or extensions can be attached to frame 12 to assist in attaching enclosure 70 to frame 12, or in supporting enclosure 70 on frame 12. For example, a plurality of ribs (not shown) may be secured to frame 12 and the various walls 80, 82, 84, 86 may be secured to the ribs. Ribs, in an illustrative embodiment, can be attached at a lower end to frame 12 and extend outwardly generally horizontally and then curve upwardly generally vertically and then optionally curve inwardly generally horizontally terminating at an upper end. Side walls 82 thus can be attached to the vertical sections of ribs (with a portion of side walls 82 curving inwardly to be attached to the lower horizontal portions of ribs). Front wall 80 and rear wall 84 can be attached to other ribs or directly to side walls 82. Top wall 86 can be attached to the upper horizontal sections of ribs or directly to side walls 82.

Referring to FIG. 3, front wall 80 acts as the lead wall of vehicle 10. As can be seen, front wall 80 preferably is configured to cooperate with and not to interfere with the operation of front wheel 14 and steering assembly 18. Further, front wall 80 can be configured to comprise a windshield 92, a windshield wiper 74, a headlight 72, and turn signals 76. In the embodiment shown in FIG. 3, windshield 92 extends downward a distance sufficient for headlight 72 of base vehicle 10 to shine through, obviating the need for a headlight on front wall 80 itself.

Referring to FIG. 4, rear wall 84 acts as the trailing wall of vehicle 10. As can be seen, rear wall 84 preferably is configured to cooperate with and not to interfere with the operation of rear wheel 16, engine 200 and drive train 202, and, as discussed in more detail below, retractable wheels 50. Further, rear wall 84 can be configured to have a hingedly engaging door 88 with a handle attached thereto allowing selective access to the interior of the enclosure 70. Additionally, rear wall 84 can be configured to have turn signals 75, brake lights 77 and license plate assembly 79.

Figure 5:
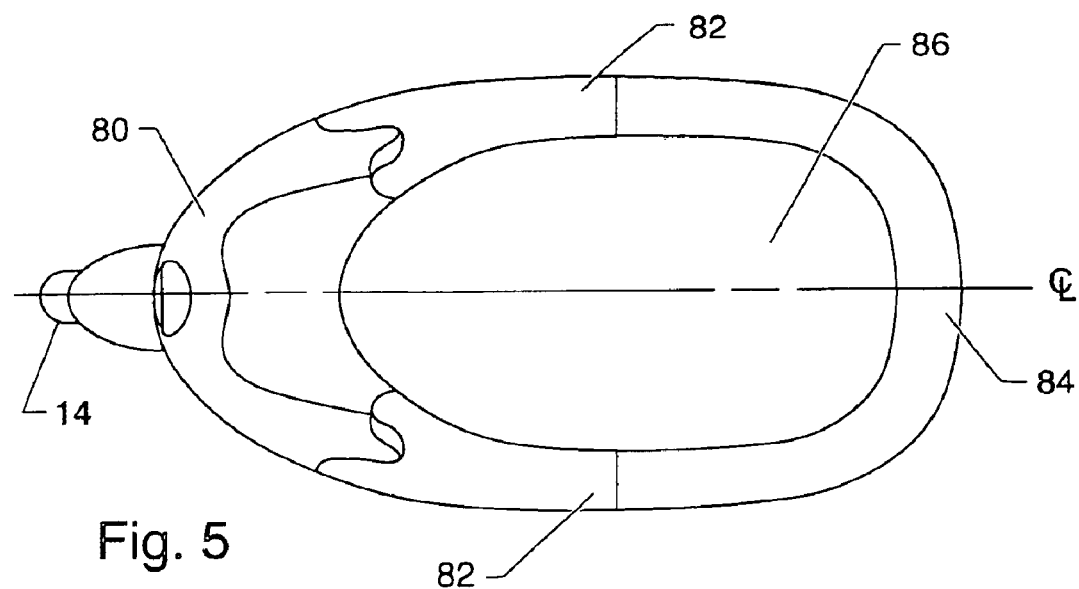
FIG. 5 is a top view of the vehicle shown in FIG. 1.

Referring to FIG. 5, top wall 86 acts as the roof or ceiling of vehicle 10. As can be seen, top wall 86 covers the entire enclosure 70 from front wall 80 to rear wall 84 and across between side walls 82. Further, top wall 86 can be configured to have a sunroof or moonroof (not shown), or to be a solid opaque, translucent or transparent (or combinations thereof) wall.

The materials of manufacture of enclosure 70 are dependent on the style and type of enclosure 70 necessary or desired, as well as on the level of safety and comfort, accessories, and equipment desired by the rider R. One of ordinary skill can determine the appropriate materials of manufacture of enclosure 70 without undue experimentation. Preferably, enclosure 70 is strong enough to withstand winds and other more aggressive environmental conditions. Canvas, metals, woods, and plastics and glasses, as well as more exotic materials such as carbon and graphite fiber based materials are suitable. Glass, clear plastics and polymers, and other transparent materials are suitable for windows 92, 94, 96. As will be readily apparent to those skilled in the art, however, the materials of manufacture of the various components of enclosure 70 can be varied without departing from the spirit and scope of the invention. Furthermore, the above described enclosure 70 is not to be limited to the exact details of construction enumerated above.

It is further contemplated that vehicle 10 can have the comforts, accessories, equipment, and other optional components of conventional vehicles. For examples, enclosure 70 can have visors, communications systems, audio systems, video systems, climate control systems, and mirrors. Further, due to the nature of enclosure 70, various storage compartments and areas can be made available, such as storage box 71 shown in FIG. 2.

Enclosure 70 preferably is manufactured or mounted upon frame 12 so that enclosure 70 is relatively well balanced upon frame 12. Obviously, if enclosure 70 is positioned off-balance on frame 12, the entire vehicle 10 may lean to one side, which can be dangerous and possibly reduce gas mileage. Importantly, if enclosure 70 is positioned off-balance, there may be a greater likelihood that vehicle 10 with enclosure 70 may tip to one or the other side, or tip over.

As is apparent, enclosure 70 must not interfere with either the steering or driving of vehicle 10. As such, enclosure 70 can be manufactured and mounted so as to allow the free movement of front wheel 14 and steering mechanism 18 of vehicle 10, and so as to allow the free operation of rear wheel 16 and drive components 202 of vehicle 10. Further, if retractable wheels 50 are included, enclosure 70 must allow free operation of retractable wheels 50. The actual final structural design of enclosure, in light of this disclosure, is within the skill level of an ordinary automotive designer.

Retractable Wheels

Figure 6:
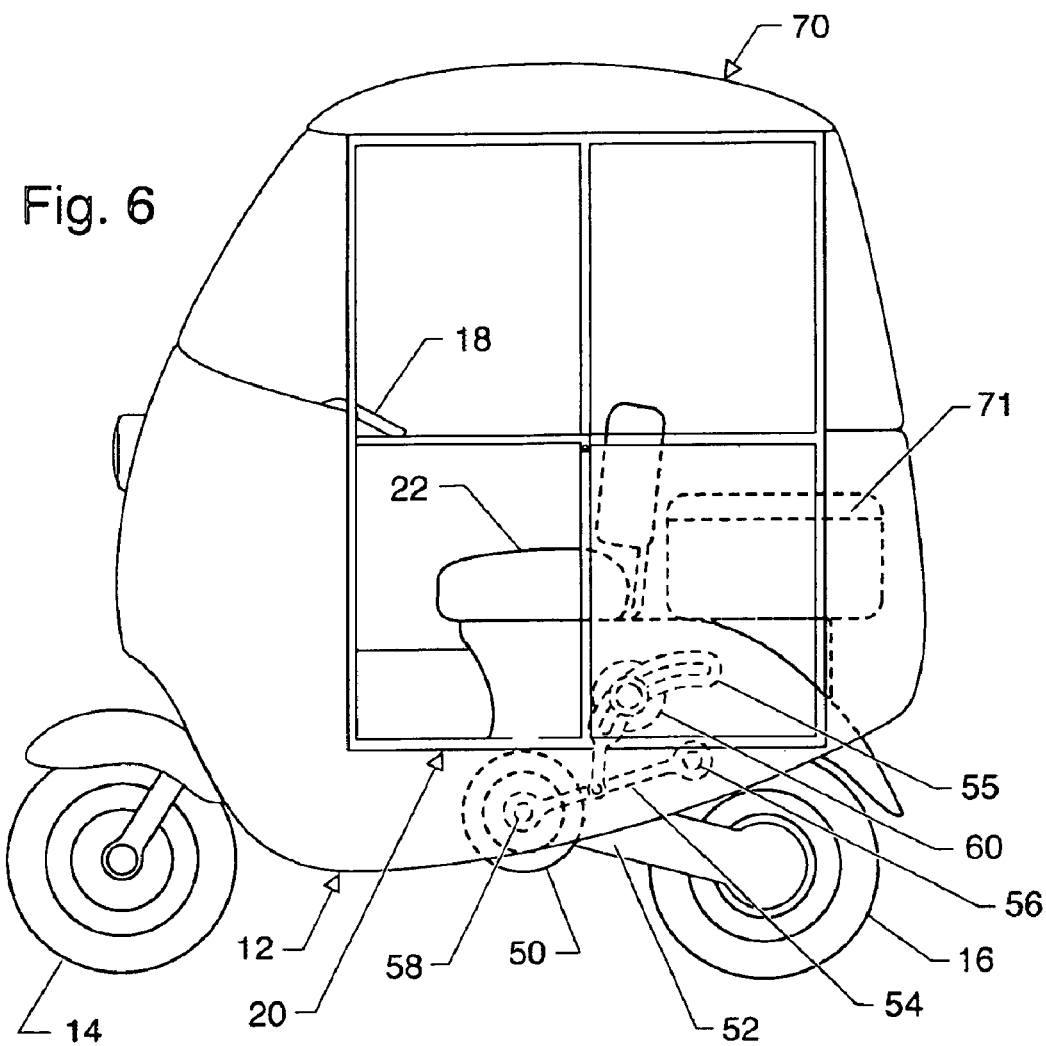
FIG. 6 is a side view of the vehicle shown in FIG. 2 illustrating a first exemplary retractable wheel assembly in the retracted position.
Figure 7:
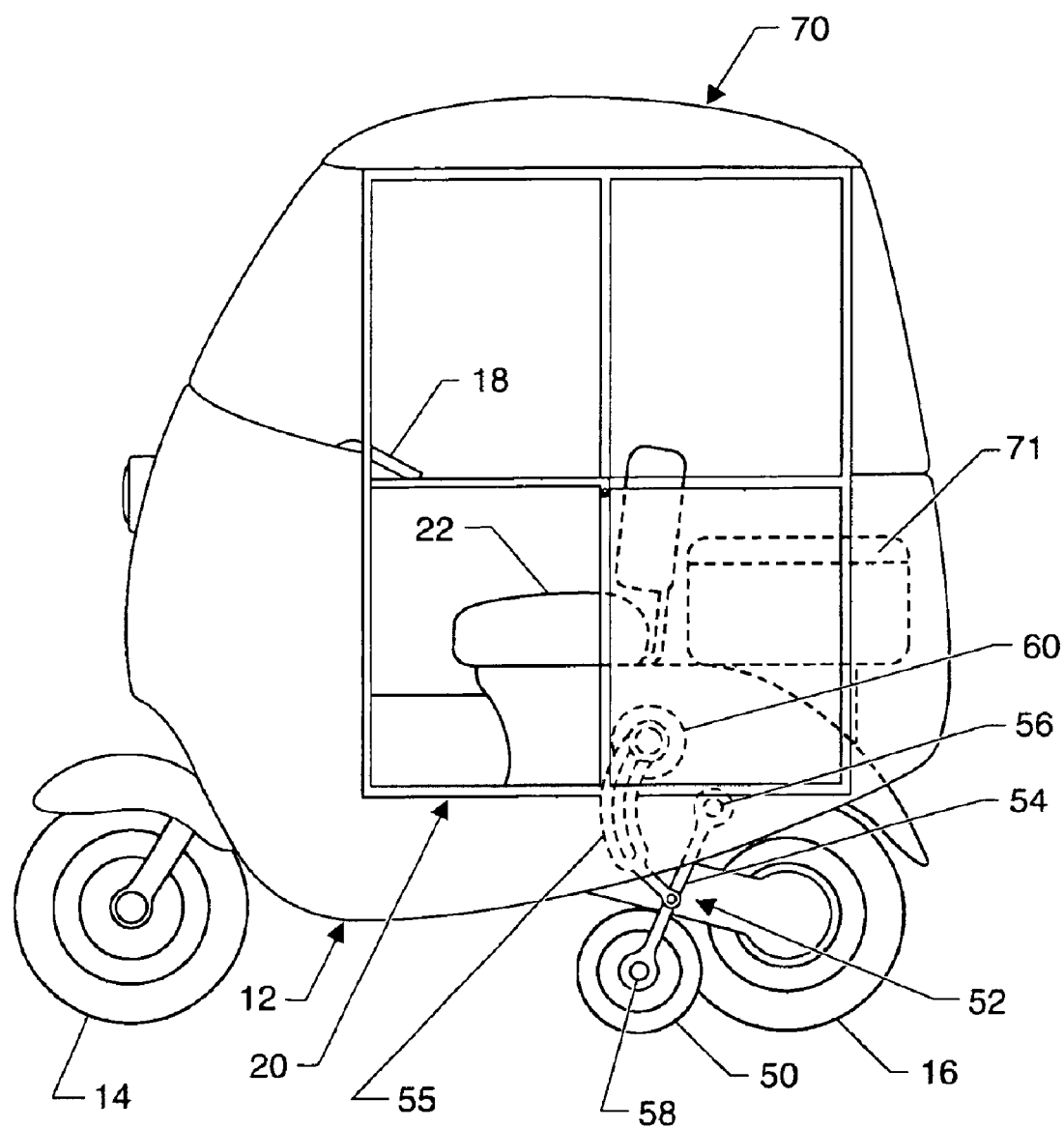
FIG. 7 is a side view of the vehicle shown in FIG. 2 illustrating a first exemplary retractable wheel assembly in the extended position.
Figure 8:
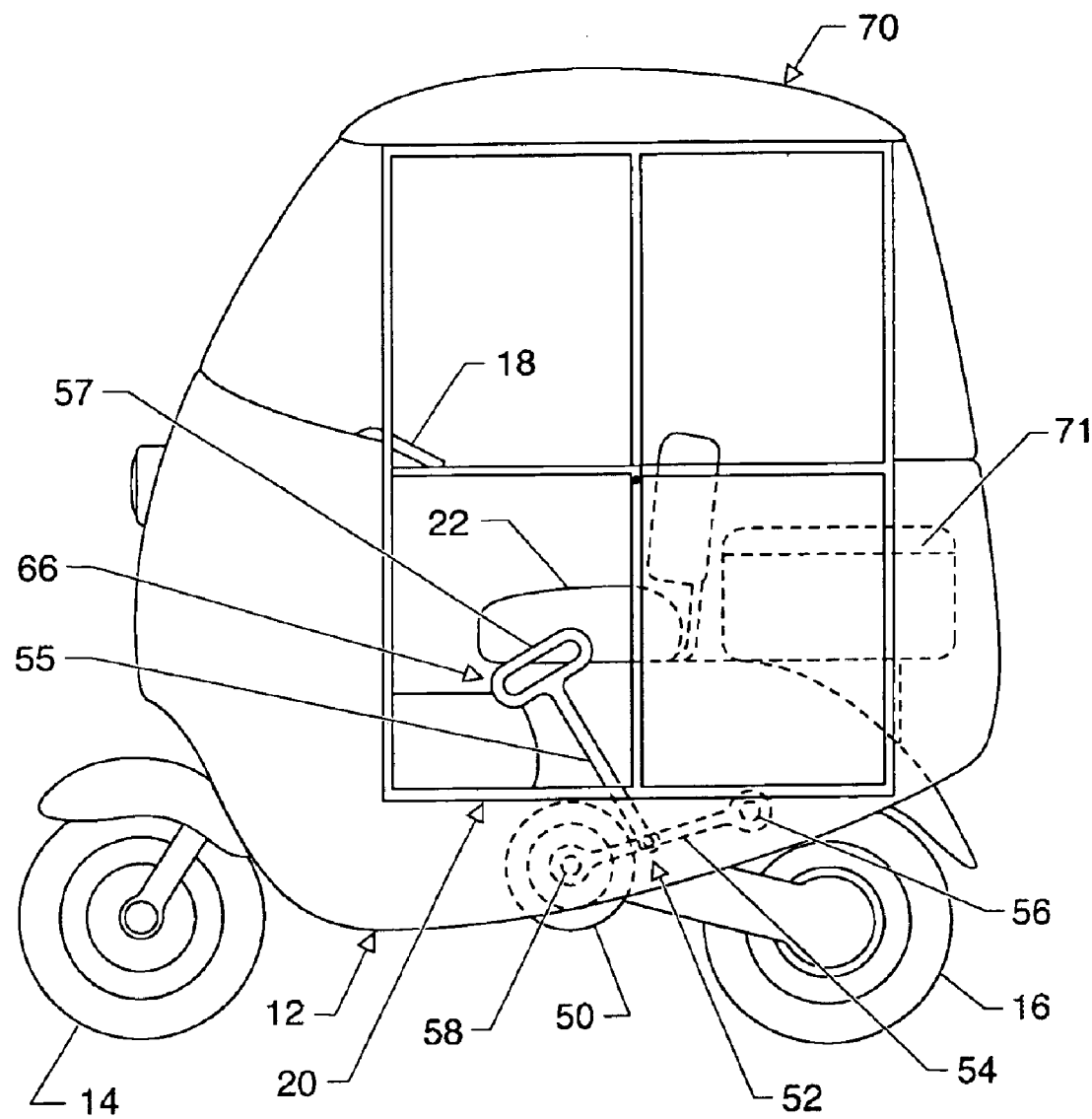
FIG. 8 is a side view of the vehicle shown in FIG. 2 illustrating a second exemplary retractable wheel assembly in the retracted position.

Referring to FIGS. 6–8, while enclosure 70 provides protection to rider R, retractable wheels 50 add stability to vehicle 10 by, when extended, preventing vehicle 10 from tipping over. Because a preferred vehicle 10 has two wheels 14, 16 along a center axis CL, vehicle 10 is less stable in the direction normal to center axis CL and can tip over without the additional support provided by retractable wheels 50, particularly when stopped, traveling at slower speeds, or cornering. While retractable wheels 50 may be located at many places along the side of vehicle 10, retractable wheels 50 are preferably proximal to the rear of vehicle 10 because such an arrangement minimizes interference with the front wheel 14 steering assembly 18 in controlling the direction of vehicle 10 and with the legs of the rider R.

Retractable wheels 50 can be constructed to be retractable by an automatic system such as motor 60 as exemplified in FIG. 1 or a manual system such as pull handle 66 as exemplified in FIG. 2. If an automatic system is used, retractable wheels 50 preferably are retracted when vehicle 10 is moving, or moving above a preset speed. For example, retractable wheels 50 can automatically retract when vehicle 10 is moving faster than 25 miles per hour (40 kph). Preferably, retractable wheels 50 automatically retract when vehicle 10 is moving faster than 15 miles per hour (24 kph). Even more preferably, retractable wheels 50 automatically retract when vehicle 10 is moving faster than 7–10 miles an hour (11–16 kph). One of ordinary skill in the art can select speeds at or above which retractable wheels 50 will automatically retract.

Referring to FIGS. 6 and 7, an illustrative example of an automatic, or motorized, extension and retraction system contemplated by this invention is shown. Referring to FIG. 8, an illustrative example of a manual, or hand actuated, extension and retraction system contemplated by this invention is shown. FIGS. 6 and 7 illustrate vehicle 10 equipped with automatically retractable wheels 50 as one illustrative embodiment of this invention. More particularly, vehicle 10 has retractable wheels 50 illustrated in the down or extended position in FIG. 6 and in the up or retracted position in FIG. 7.

Referring to FIGS. 6 and 7, retractable wheel 50 is operationally attached to frame 12 via leg assembly 52. For purposes of this specification, only one leg assembly 52 will be discussed as the leg assemblies 52 for each side of vehicle 10 are substantially similar or identical, and may be possibly mirror images of each other, and the same component reference numbers will be utilized. Leg assembly 52 preferably comprises strut 54, attached at its proximal end to vehicle 10 at pivot point 56. Axle 58 is located at the distal end of strut 54 and is associated with a retractable wheel 50.

It is understood that the retractable wheel 50 may be replaced by a ski, float, or other ground contact member depending on the environment in which vehicle 10 is to be operated. Further, retractable wheel 50 and any other such ground contact member can be replaceable and interchangeable. One such ground contact member can be a rigid or semi-rigid material or composite such as a pole vault pole. In a manner similar to the retractable wheel 50, the ski, float, pole or other ground contact member can be extended and retracted.

Pivot point 56 either can be an attachment point on frame 12 or another part of vehicle 10 or can be a drive shaft of an actuating motor 60 for extending and retracting retractable wheel 50. If pivot point 56 is an attachment point on frame 12, leg assembly can further comprise control arm 55 attached to strut 54 and extending to an actuating motor 60 located strategically on vehicle 10 or within enclosure 70. When actuating motor 60 is activated to extend retractable wheel 50, actuating motor 60 pivots or otherwise moves control arm 55 in a direction, generally downward, thus moving retractable wheel 50 downward into the extended position shown in FIG. 6. When actuating motor 60 is activated to retract retractable wheel 50, actuating motor 60 pivots or otherwise moves control arm 55 in a direction, generally upward, thus moving retractable wheel 50 upward into the retracted position shown in FIG. 7. Actuating motor 60 can comprise an internal or external locking means (not shown) to hold retractable wheel 50 in either or both of the extended and retracted positions. Other locking means, mechanical or otherwise, also can be incorporated without undue experimentation.

Alternatively, if pivot point 56 is the drive shaft of actuating motor 60, control arm 55 can be unnecessary. When actuating motor 60 is activated to extend retractable wheel 50, actuating motor 60 pivots or otherwise rotates strut 54 in a direction, generally downward, thus moving retractable wheel 50 downward into the extended position shown in FIG. 6. When actuating motor 60 is activated to retract retractable wheel 50, actuating motor 60 pivots or otherwise rotates strut 54 in a direction, generally upward, thus moving retractable wheel 50 upward into the retracted position shown in FIG. 7. Actuating motor 60 can comprise a locking means as disclosed above to hold retractable wheel 50 in either or both of the extended and retracted positions. Other locking means, mechanical or otherwise, also can be incorporated without undue experimentation.

Control arm 55 can be paired with or replaced by a tension spring (not shown). Tension spring can be used to dampen the movement of strut 54, to help rotate strut 54, and/or to help maintain strut 54 in a desired position (retractable wheels 50 extended or retracted), depending on the placement of tension spring (not shown). Tension spring also can be use to retract retractable wheel 50 when actuating motor 60 is deactivated, thus eliminating the need for a reversible actuating motor 60.

Referring to FIG. 8, vehicle 10 is shown equipped with manually retractable wheels 50 as another illustrative embodiment of this invention, with retractable wheels 50 illustrated in the down or extended position. FIG. 2 shows vehicle 10 equipped with manually retractable wheels 50 in the up or retracted position. In this embodiment, control arm 55 terminates in a handle 57 on the end opposite the connection to strut 54. Handle 57 is proximal to rider R such that rider R can pull handle 57 upwards to retract retractable wheels 50 and push handle 57 downwards to extend retractable wheels 50. Control arm 55 can comprise a locking means to hold retractable wheel 50 in either or both of the extended and retracted positions. Other locking means, mechanical or otherwise, also can be incorporated without undue experimentation. A tension spring (not shown) also can be used with a manual retraction system to dampen the movement of strut 54, to help rotate strut 54, and/or to help maintain strut 54 in a desired position (retractable wheels 50 extended or retracted), depending on the placement of tension spring (not shown).

When fully extended, the lowest part of each retractable wheel 50 is coplanar with or above a plane comprising the lowest part of front wheel 14 and the lowest part of rear wheel 16 (wheel being defined as including both the rim and the tire, if both are present). In most cases, the plane comprising the lowest part of front wheel 14 and the lowest part of rear wheel 16 is the road surface. Thus, when extended, retractable wheels 50 either touch the road surface such that vehicle 10 has four wheels touching the road surface, or are above the road surface such that a tipping of vehicle 10 from the vertical or upright position will cause one of retractable wheels 50 to touch the road surface.

Retractable wheels 50 allow rider R to control the lean of vehicle 10 into and out of turns. That is, retractable wheels 50, when extended, may contact the ground when vehicle 10 is leaned into a curve. This small amount of contact makes vehicle 10 more easily ridden for persons that may not have a good sense of balance and makes vehicle 10 more easily handled by rider R. Retractable wheels 50 are positioned on frame 12 so that they do not affect the function of either front wheel 14 or rear wheel 18 when turning vehicle 10.

Systems for automatically extending and retracting retractable wheels 50 are within the knowledge of those skilled in the art. As a first basic example, such a system can comprise a reversible motor 60 mounted on frame 12 with an on/off or up/down switch (not shown) located on handlebar and steering assembly 18 and electrically connected to motor 60. Motor 60 can be powered by vehicle 10's battery (not shown) or alternator (not shown). When rider R wishes to extend retractable wheels, rider R presses the switch, thus activating motor 60, which extends retractable wheels 50. To retract retractable wheels 50, rider R can release switch, or move switch to a different position, depending on the type of switch.

Another basic example of a system for automatically extending and retracting retractable wheels 50 also can comprise a reversible motor 60 mounted on frame 12, but this time with an automatic switch (not shown) connected to vehicle 10's speedometer and electrically connected to motor 60. As above, motor 60 can be powered by vehicle 10's battery (not shown) or alternator (not shown). When vehicle 10 decelerates to below a predetermined speed, automatic switch is activated by speedometer, thus activating motor 60 in an extension direction, which extends retractable wheels 50. When vehicle 10 accelerates to above the predetermined speed, automatic switch either is activated by speedometer to reverse motor 60 to a retraction direction, thus retracting retractable wheels 50, or automatic switch is deactivated by speedometer, thus deactivating motor 60, allowing tension spring to retract retractable wheels 50.

Retractable wheels 50 also can function as a kickstand when extended and as an added safety device when retracted. In a kickstand example, when retractable wheels 50 are extended, vehicle 10 can be supported by them in a parked position, thus mimicking and eliminating the need for a separate kickstand. When retractable wheels 50 are extended, this embodiment of vehicle 10 will remain generally upright so that vehicle 10 is safer to use and ride and to slow down, stop at traffic signals, and park. Further, as vehicle 10 stands upright, rider R can ingress or egress from the enclosure 70 more easily, and can park vehicle 10 more easily. In an added safety device example, when retractable wheels 50 are retracted, they can act as side bumpers or protection from side impact.

Retractable wheels 50 are extremely useful, multi-functional, unique additions to a vehicle, making a vehicle safer, more convenient, and more desirable.

Sliding Panel System

Referring to FIGS. 9 and 10, enclosure 70 includes a means for entering and exiting enclosure 70. FIG. 9 shows the means for entering and exiting enclosure 70 as a simple flexible panel P. FIG. 10 shows the means for entering and exiting enclosure 70 as a system of preferably rigid sliding panels 114.

Figure 11:
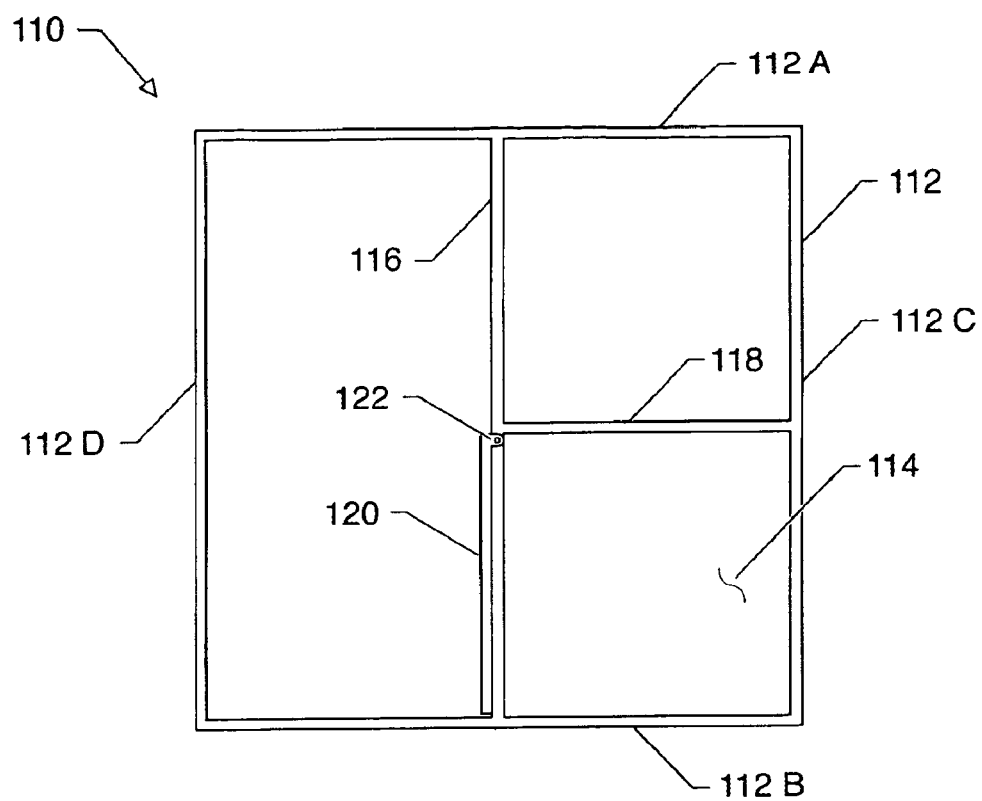
FIG. 11 is a front view of an illustrative embodiment of a sliding panel system for entering and exiting the vehicle enclosure for use with this invention with the panels in a stored position.

Referring to FIGS. 11–17, an illustrative sliding panel system utilized as a means for entering and exiting enclosure 70 comprises frame 112 containing a plurality of sliding panels 114. Frame 112 and panels 114 in combination generally constitutes a single sliding panel unit 110 that can be installed or retrofitted in an appropriate location on enclosure 70. Panels 114 slide along horizontal and vertical axes within frame 112 so that placement of panels 114 can close frame 112 entirely, or create openings of different sizes, shapes and locations within frame 112. As shown in FIG. 11, one embodiment of sliding panel unit 110 comprises frame 112, panels 114, vertical crossbar 116, horizontal crossbar 118, and moveable crossbar 120.

For illustrative purposes throughout FIGS. 11–17, the sliding panel system comprises rectangular frame 112, vertical crossbar 116, horizontal crossbar 118, moveable crossbar 120, and a plurality of panels 114. Frame 112 in this illustrative embodiment is a relatively lightweight and strong quadrilateral with opposite sides parallel and equal in length. Vertical crossbar 116 extends from top side 112A center of frame 112 to bottom side 112B center of frame 112. Horizontal crossbar 118 extends from the center of first side 112C of frame 112 to the center of vertical crossbar 116. Moveable crossbar 120 is attached to the center of vertical crossbar 116 or the center of second side 112D of frame 112 by pivoting device 122 or hinge so that it can be folded downwards or upwards vertically proximal to vertical crossbar 116 or second side 112D of frame 112 or pivoted to be horizontal preferably spanning the distance between vertical crossbar 116 and second side 112D of frame 112. Panels 114 can be stored in one corner of frame 112 and moved to different parts within frame 112 when in use. Frame 112, vertical crossbar 116, horizontal crossbar 118, and moveable crossbar 120 can be made from any appropriate structural materials, currently known or developed in the future, such as wood; plastic and other polymers; aluminum, steel, titanium and other metals; fibreglasses, graphite and carbon composites, and other composites; or any relatively lightweight, relatively strong, stable material.

FIG. 11 illustrates that frame 112 can be structured so as to contain and retain panels 114. FIG. 11 illustrates panels 114 in a stored position in the lower right quadrant, wherein the remaining three-quarters of the area in frame 112 is open, namely, the lower left, upper right and upper left quadrants. This allows a passenger or driver to enter and exit the vehicle through the left half of frame 112.

Panels 114 also can be quadrilaterals with opposite sides parallel and equal. Panel 114 length preferably is equal to or slightly less than approximately half the length of frame 112, and panel 114 width preferably is equal to or slightly less than approximately half the width of frame 112 so that, at all times, each panel 114 will sit securely yet slidably between frame 112 and the appropriate set of crossbars 116, 118, 120. The thickness, or depth, of each panel 114 is dependent on the materials of manufacture and the purpose of panel 114, as discussed in more detail below, but preferably is less than the total depth of frame 112. Panels 114 can be made from materials such as woods; plastic and other polymers; aluminum, steel, titanium and other metals; transparent, translucent, colored and opaque glasses; wire screens; insulative, shatter resistant, bullet proof or other specialty materials; or any other suitable material, or a combination of two or more of the above. For example, in one embodiment, two panels 114 can be made of aluminum, one panel 114 can be made of glass, and one panel 114 can be made of half glass and half aluminum.

Vertical crossbar 116 extends from top side 112A of frame 112 to bottom side 112B of frame 112. Vertical crossbar 116 preferably is centered generally between first side 112C of frame 112 and second side 112D of frame 112 so that one or more panels 114 can be placed on each side of vertical crossbar 116. The width of vertical crossbar 116 can be thicker or thinner than the width of the walls of frame 112. Vertical crossbar 116 can have a flat, rectangular cross-section and function more of a brace. Alternatively, vertical crossbar 116 can have a shaped cross-section and be used, for example, as a guide for rollers attached to panels 114, as discussed in more detail below.

Horizontal crossbar 118 extends from first side 112C of frame 112 to vertical crossbar 116 so that its length generally is approximately one-half the horizontal length of frame 112. Horizontal crossbar 118 preferably is centered generally between top side 112A of frame 112 and bottom side 112B of frame 112 so that panel 114 can be placed above and below horizontal crossbar 118. The width of horizontal crossbar 118 also can be thicker or thinner than the width of the walls of frame 112. Horizontal crossbar 118 also can have has a flat, rectangular cross-section and function more of a brace. Alternatively, horizontal crossbar 118 also can have a shaped cross-section and be used, for example, as a guide for rollers attached to panels 114, as discussed in more detail below.

Vertical crossbar 116 and horizontal crossbar 118 are added to support the structure of frame 112 and to block the cracks between panels 114 when panels 114 are in the closed position. If vertical crossbar 116 and horizontal crossbar 118 are used as braces only, the thickness of vertical crossbar 116 and horizontal crossbar 118 preferably does not extend into the inner portion of frame 112. Thus, such fixed crossbars 116, 118 are not contained within the sliding panel area of frame 112, rather they are attached to frame 112 so that panels 114 slide either in front of or behind flat crossbars 116, 118. Alternatively, if vertical crossbar 116 and horizontal crossbar 118 are used as guides for guiding and holding panels 114 in place, crossbars 116, 118 have a formed cross-section allowing a guiding portion of panels 114, such as roller or pads, to fit within the cross-section of crossbars 116, 118, as shown illustratively in FIG. 20.

Moveable crossbar 120 can be attached to vertical crossbar 116 by pivoting device 122 or hinge so that moveable crossbar 120 can be folded downwards or upwards vertically or pivoted to be horizontal. When moveable crossbar 120 is in its downward or upward vertical position, moveable crossbar 120 generally is parallel to and proximal or touching vertical crossbar 116. In this position, as shown illustratively in FIG. 11, there is provided an opening in half of the area of frame 112, specifically the left side of frame 112. This allows a passenger or driver to enter and exit the vehicle.

Pivoting moveable crossbar 120 to be horizontal helps close the panel system. Moveable crossbar 120 is pivoted to the horizontal position, in which position the end of moveable crossbar 120 distal from the pivoting device 122 and vertical crossbar 116 is now proximal to second side 112D of frame 112. Moveable crossbar 120 can be locked in place against second side 112D of frame 112 using any known or future developed locking means, such as latches, pins, clips, sliding bars, and the like. Once moveable crossbar 120 is in place against or proximal to second side 112D of frame 112, moveable crossbar 120 supports panel 114 that has been slid over moveable crossbar 120, as shown in more detail in FIGS. 15 and 16. Further, moveable crossbar 120 can be structured to block cracks between panel 114 and moveable crossbar 120 when the panel system is in the closed and semi-closed positions.

Figure 12:
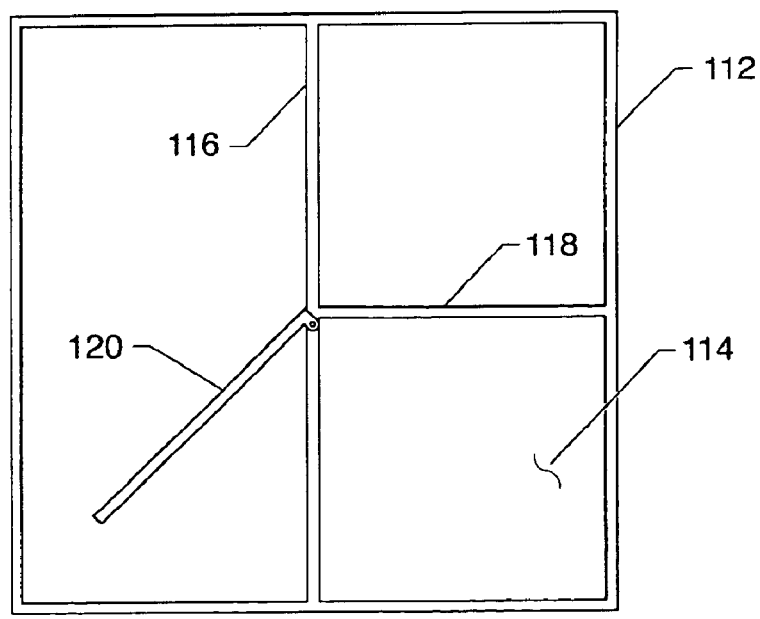
FIG. 12 is a front view of the embodiment of the sliding panel system of FIG. 11 with the panels in a stored position and the movable crossbar pivoted upwards to be horizontal.
Figure 13:
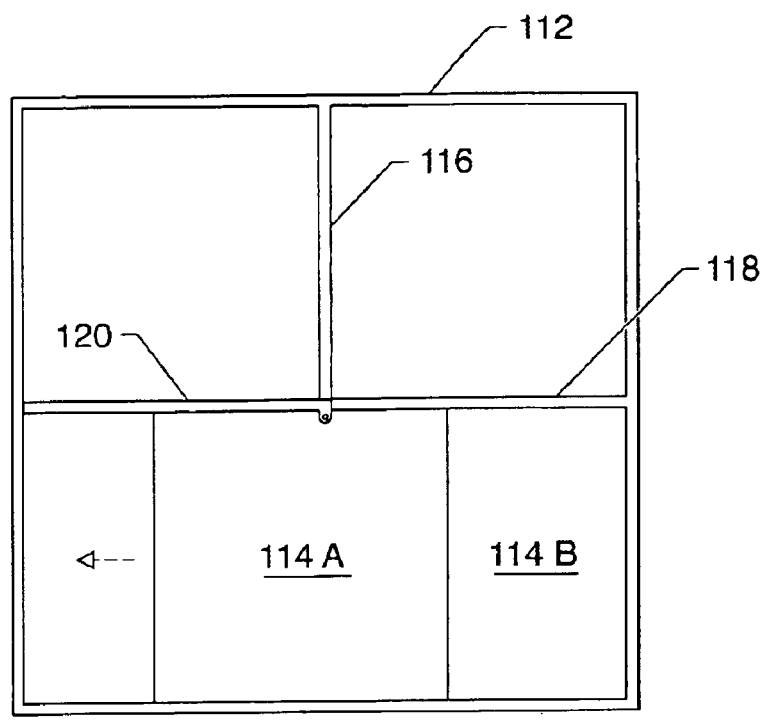
FIG. 13 is a front view of the embodiment of the sliding panel system of FIG. 11 with a first panel slid to the side and underneath the movable crossbar, exposing a second panel.

FIG. 11 illustrates moveable crossbar 120 in a folded down vertical position lying adjacent to the lower half of vertical crossbar 116. In FIG. 12, moveable crossbar 120 is being pivoted upwards to be horizontal. In FIG. 13, moveable crossbar 120 is in the horizontal position and is adjacent to left side 112D of frame 112, which is the operating position for supporting panel 114. Moveable crossbar 120 generally is attached to the middle of vertical crossbar 116 so that the point of attachment is on the same linear plane with horizontal crossbar 118 and so that the point of attachment is in the center of frame 112. The width of moveable crossbar 120 also can be thicker or thinner than the width of the walls of frame 112. Moveable crossbar 120 also can have a flat, rectangular cross-section and function more of a brace. However, as moveable crossbar 120 generally supports one or more panel 114, moveable crossbar 120 also can have a shaped cross-section and be used, for example, as a guide for rollers attached to the panels 114. More specifically, moveable crossbar 120 have a formed cross-section allowing a guiding portion of panels 114, such as roller or pads, to fit within the cross-section of crossbars 116, 118, as shown illustratively in FIG. 20.

Referring now to FIGS. 12–17, the operation of sliding panel unit 110 is shown in greater detail. With panels 114 in a stored position, at least a portion of the internal area of frame 112 is open. For example, when panels 114 in a four-panel configuration are in the stored position in a corner of frame 112, three-quarters of the area of frame 112 is open. This opening allows a passenger or driver to enter and exit vehicle 10.

FIG. 11 illustrates an embodiment of sliding panel unit 110 in the open position. To close sliding panel system 110, moveable crossbar 120 is pivoted upward or downward, as appropriate, to be horizontal and extend between vertical crossbar 116 and second side 112D of frame 112. A single panel 114A, previously stored in a corner of frame 112, can be slid from the stored position and underneath moveable crossbar 120. This closes the bottom half of frame 112 while leaving the top half open. Another single panel 114B can be slid upwards from the stored position and locked into place. This closes three-quarters of frame 112 while leaving one top quadrant open. This same panel 114B can be slid across and over moveable crossbar 120. In this position, one top quadrant of frame 112 is left open and the remaining three quadrants are closed. Another single panel 114C from the stored position can be slid upwards and locked into place, thus closing entire frame 112. The remaining panel 114D in the stored position remains there, and can be permanently mounted so that it is not slidable, or it can be made slidable so that more configurations can be created.

FIG. 12 illustrates the initial moving of moveable crossbar 120 towards the horizontal position. Panels 114 are capable of displacement between an open position where panels 114 are contained in one corner of frame 112, and a closed position where panels 114 are moved aside with respect to the open position. Variations of closed and open positions can be formed depending on where panels 114 are contained within frame 112.

FIG. 13 illustrates the process of sliding panel 114A to the side, underneath moveable crossbar 120, where it will come into contact with second side 112D of frame 112. Now moveable crossbar 120 also can be laterally supported by the upper horizontal edge of panel 114A, as well as, or alternatively, being locked into place by latches, pins, bolts or the like, or both. In this position, the top half of frame 112 is open and the bottom half is closed. Specifically, in this position, the top left quadrant of frame 112 is open and the remaining three quadrants are closed. Panels 114 pass from one to the other of these various positions by lateral and longitudinal displacement in a direction from the closed plane to the opening plane and sliding in the opening plane.

Figure 14:
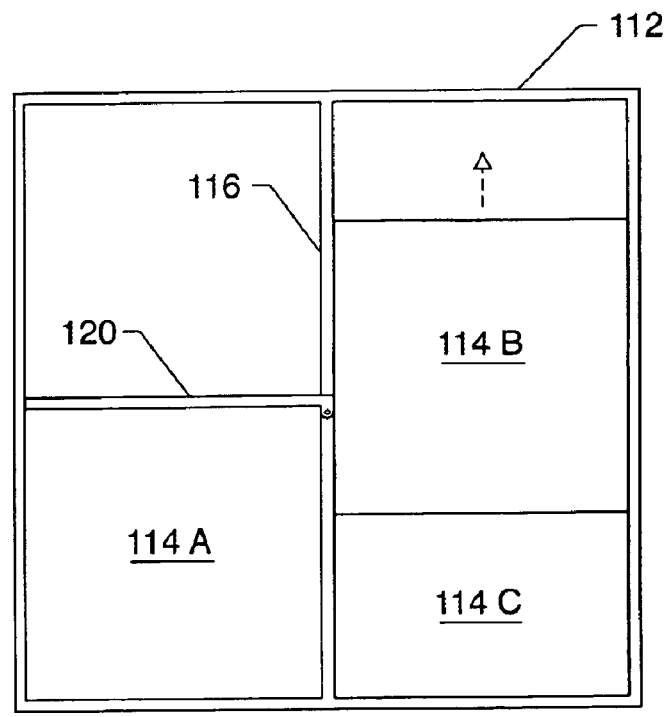
FIG. 14 is a front view of the embodiment of the sliding panel system of FIG. 11 with the first panel slid to the side and underneath the movable crossbar, and a second panel slid upwards, exposing a third panel.

FIG. 14 illustrates the process of sliding panel 114B, which was behind panel 114A in this illustrative embodiment, upwards between vertical crossbar 116 and first side 112C of frame 112. Panel 114B can be left in this position, that is, in the upper right of frame 112, by locking panel 114B within frame 112 by the means disclosed below. In this position, the top half of the panel system frame 112 is half closed and the bottom half is closed. Horizontal crossbar 118 does not necessarily laterally support panel 114B, as panel 114B can be slid in front of or behind flat horizontal crossbar 118. Alternatively, horizontal crossbar 118 can have a structure allowing it to support the bottom edge of panel 114B when panel 114B is in the upper position.

Figure 15:
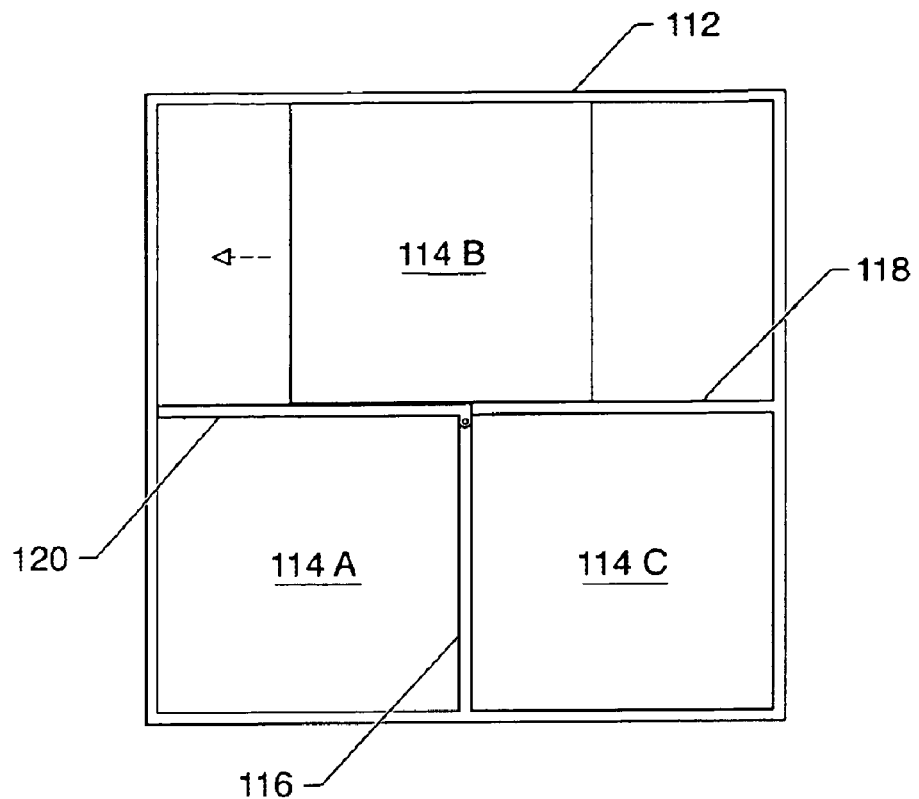
FIG. 15 is a front view of the embodiment of the sliding panel system of FIG. 11 with the first panel slid to the side and underneath the movable crossbar, and the second panel slid across and above the movable crossbar.

FIG. 15 illustrates the process of sliding panel 114B laterally over movable crossbar 120, where it will come into contact with second side 112D of frame 112. Now moveable crossbar 120 also can support panel 114B. In this position, the top half of the panel system frame 112 is half closed and the bottom half is closed. Specifically, in this position, the top right quadrant of frame 112 is open and the remaining three quadrants are closed.

Figure 16:
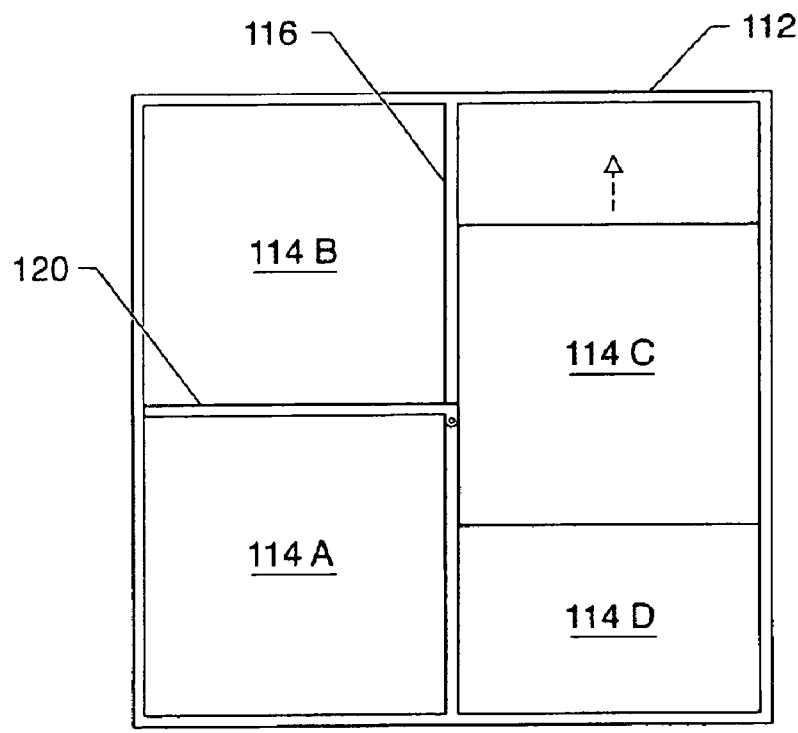
FIG. 16 is a front view of the embodiment of the sliding panel system of FIG. 11 with the first panel slid to the side and underneath the movable crossbar, the second panel slid up and then across and over the movable crossbar, and the third panel slid upwards, exposing a fourth panel.

FIG. 16 illustrates the process of sliding panel 114C, which was behind panel 114A in this illustrative embodiment, upwards between vertical crossbar 116 and first side 112C of frame 112. Panel 114C now can be left in this position, that is, in the upper right of frame 112, by locking panel 114C within frame 112 by the means already disclosed.

Figure 17:
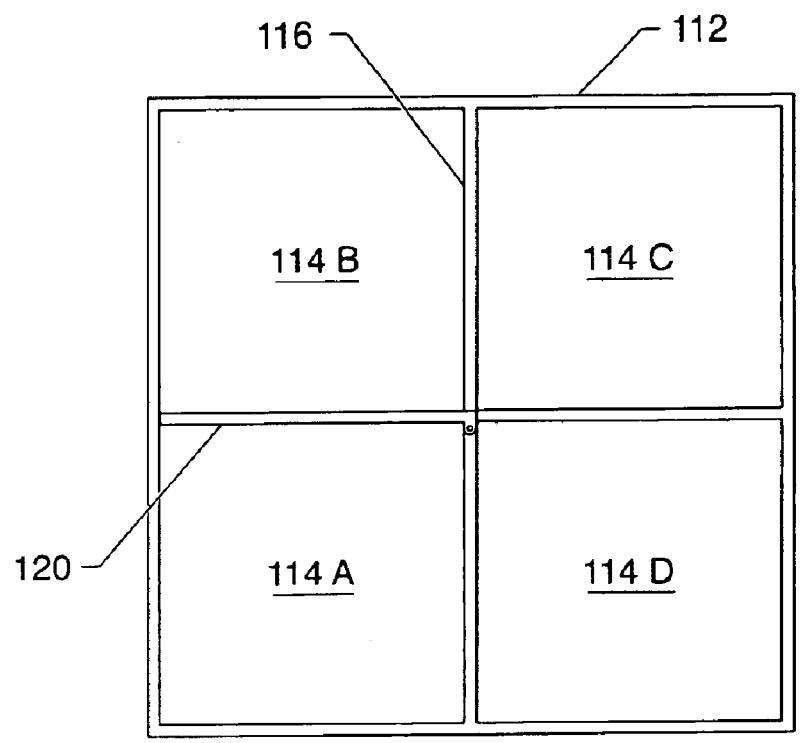
FIG. 17 is a front view of the embodiment of the sliding panel system of FIG. 11 with the first panel slid to the side and underneath the movable crossbar, the second panel slid up and then across and over the movable crossbar, and the third panel slid upwards to the top of the vertical bar.
Figure 18:
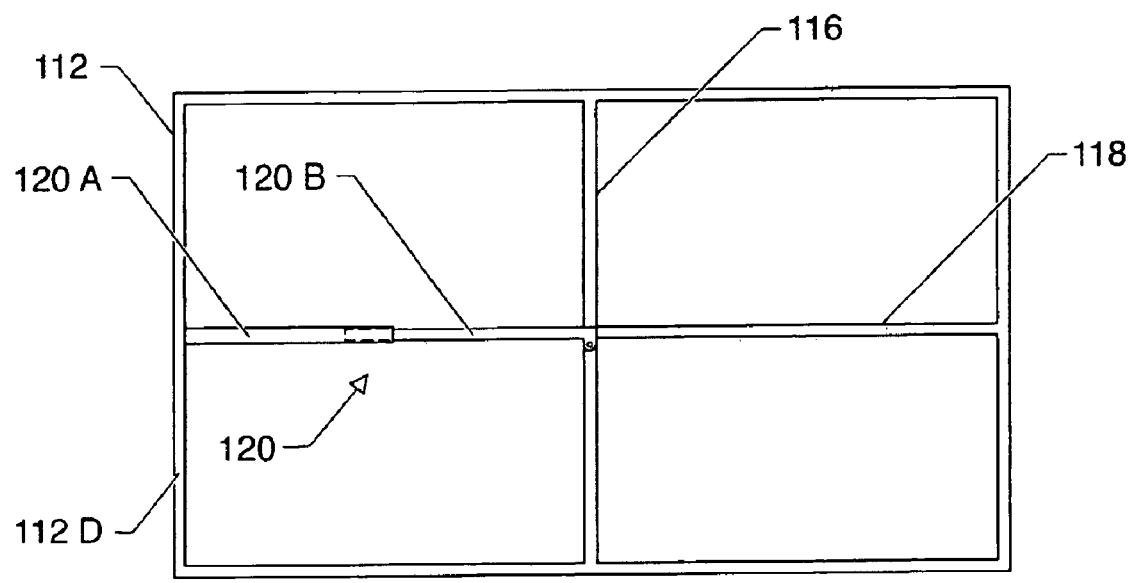
FIGS. 18A–18C are front views of several illustrative embodiments of extendable moveable crossbars, with FIG. 18A showing a telescoping configuration, FIG. 18B showing a first hinged configuration, and FIG. 18C showing a second hinged configuration.
Figure 18:
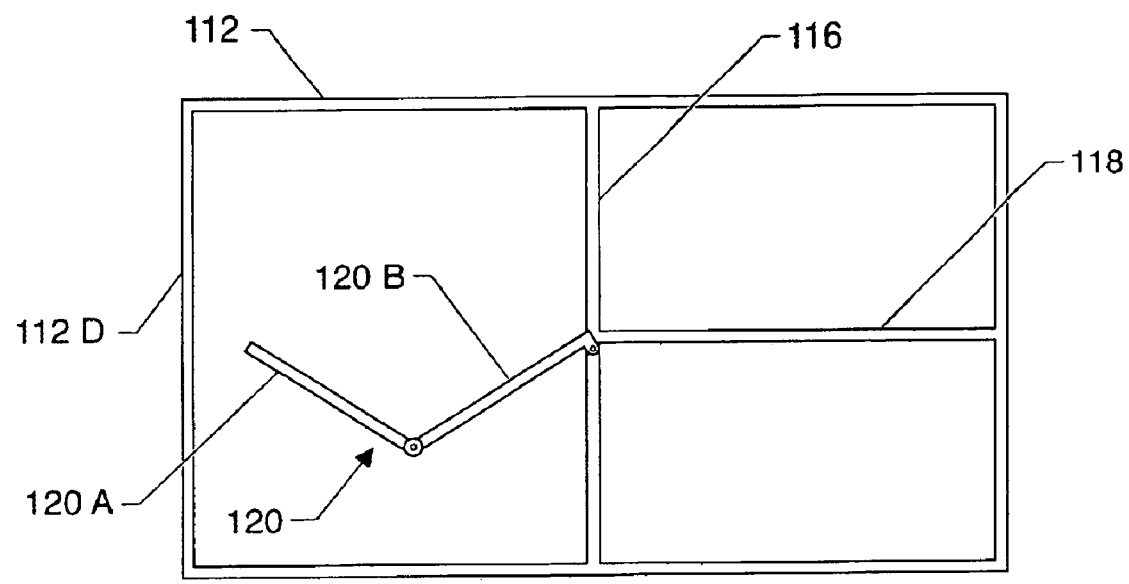
Figure 18:
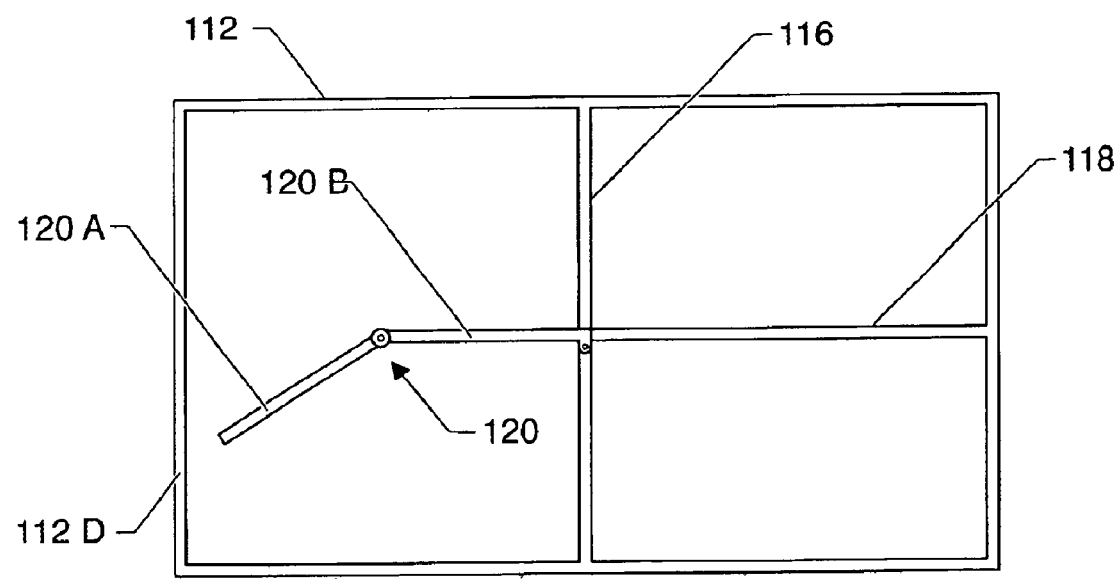

FIG. 17 illustrates the top half of panel system frame 112 closed and the bottom half closed, after panel 114C has been slid. Panel 114D can be permanently mounted so that it is not slidable, or panel 114D can be made slidable so that more configurations can be created.

FIGS. 18A–18C illustrate that the length of moveable crossbar 120 can be extendable or telescoping or foldable so that moveable crossbar 120 can make contact with second side 112D of frame 112.

Figure 19:
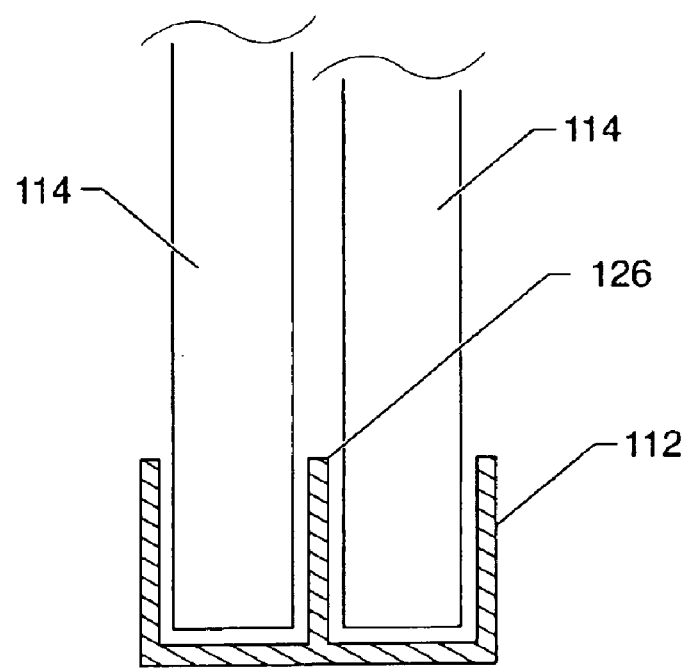
FIG. 19 is a cross-sectional view of one embodiment of the frame of the sliding panel system of FIG. 11 with two panels resting in the side of the frame.

FIG. 19 illustrates that panels 114 can sit in direct contact with the frame 112 and its adjacent crossbar 116, 118, 120, and be separated form each other by separating wall 126.

Figure 20:
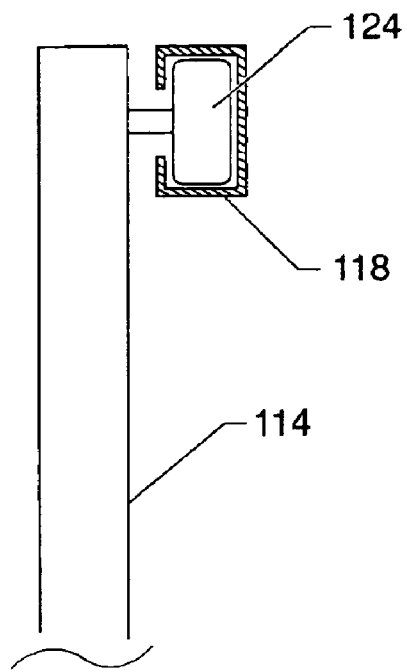
FIG. 20 is a cross-sectional view of another embodiment of the frame of the sliding panel system of FIG. 11 using rollers attached to the panels that roll within the interior of the frame.
Figure 21:
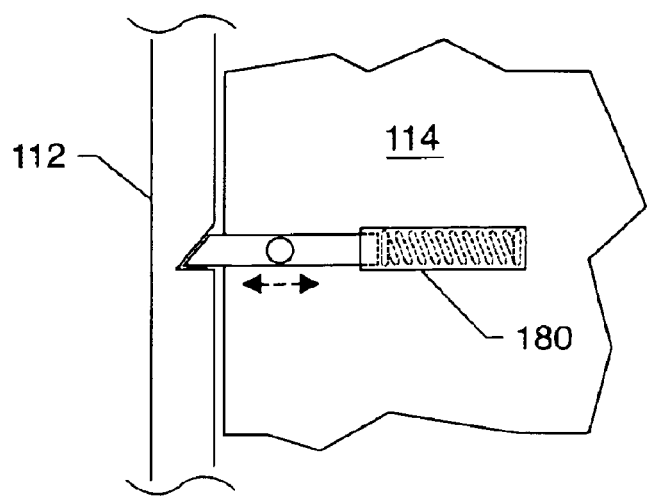
FIGS. 21A–21C are front views of several illustrative embodiments of locking mechanisms for the panels, with FIG. 21A showing a latch configuration, FIG. 21B showing a tab configuration, and FIG. 21C showing a hook configuration.
Figure 21:
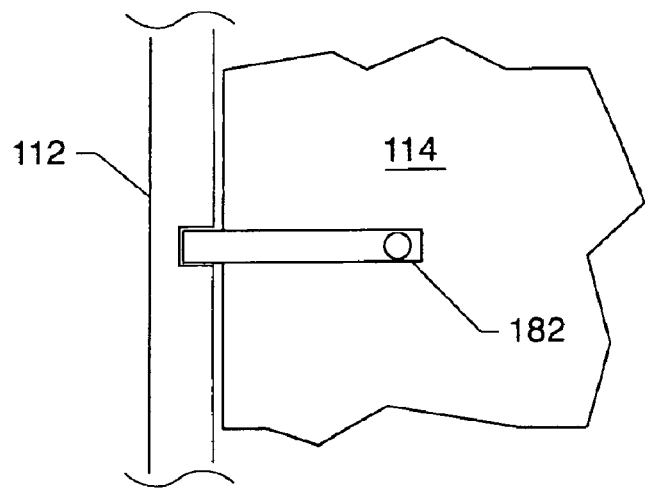
Figure 21:
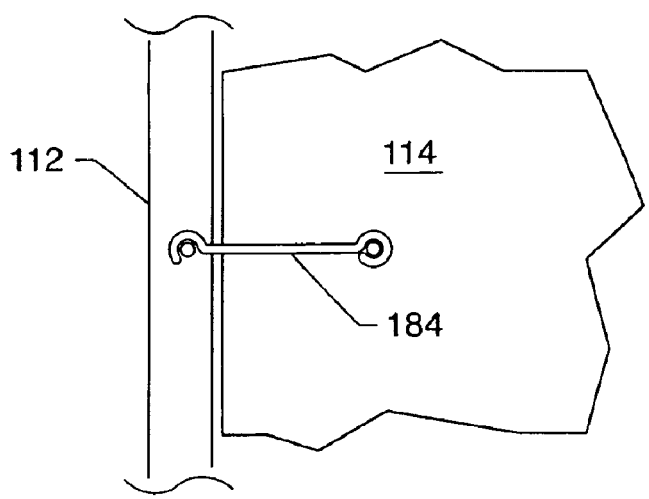

FIG. 20 illustrates an alternative embodiment in which panels 14 can be placed on a guidance device 124, such as wheels, rollers or pads, so that they slide along the inner walls of the frame 112 and crossbars 116, 118, 120. Guidance device 124 can be placed on one, two, three, or all four sides of each panel 114. Conversely, guidance device 124 can be placed along the inner walls of frame 112 and/or along the sides of crossbars 116, 118, 120. Such guidance devices 124 and structures are known in the art, and can be similar to the common sliding glass shower door rail structure, the sliding glass patio door rail structure, and/or the folding closet door hanging structure. Some illustrative guidance devices 124 also include lower friction slides, such as nylon glides. Such guidance devices 124 dispose each panel 114 in such a way that the panel 114 is located slightly raised or removed from frame 112 or crossbars 116, 118, 120, so that panel 114 is no longer in direct contact with frame 112 or its adjacent crossbar 116, 118, 120. Panels 114 can be slid manually or be displaced by means of an electric motor (not shown).

Further, weather stripping, insulation and/or other sealants can be placed along the inner edges of frame 112 and/or along the sides of crossbars 116, 118, 120. For use as a door to help enclose vehicle 10, thin strips of rubber, plastic or felt lining frame 112 and crossbars 116, 118, 120 can exclude rain, snow and/or cold air. Sealants to prevent outside air, which may be contaminated or otherwise undesirable, from entering vehicle 10 also may be placed along the inner edges of frame 112 and/or along the sides of crossbars 116, 118, 120.

FIGS. 21A–21C illustrate example locking devices, such as latches 180, pins 182, hooks 184, bolts or the like, that can be attached to panels 114 to hold panels 114 into place if need be. Locking devices can also be placed on the inner edges of frame 112 and/or on the sides of crossbars 116, 118, 120. Such locking devices are known and can be similar to those currently use on sliding windows and screens in residences. Otherwise, panels 114 can be held in place by friction or the surrounding structures.

In addition to closure by lateral and longitudinal displacement of panels 114, various configurations can also be made by using different materials as panels 114. For example, in one embodiment, panels 114A, 114D can be aluminum, and panels 114B, 114C can be glass or wire screen. In this embodiment, the bottom half of closed panel system 110 is solid and opaque and the top half of closed panel system 110 is translucent or permeable. For use on vehicle 10, it is preferable that at least panel 114B is a window. Panels 114A and 114C also can be windows, as well as panel 114D. Additionally, in several other illustrative embodiments, panels 114 can be insulative or non-insulative, shatterproof or break and crack resistant, or bulletproof.

Sliding panel unit 110 allows multiple panels 114 to slide along both the horizontal and vertical axes of the frame 112. Such a multi-directional displacement can create openings of different sizes, shapes and locations within frame 112. Panels 114 can take up little space but can be rigid enough when closed to withstand high winds and other weather elements. Panels 114 are conveniently contained within frame 112 so there are no loose pieces to be lost or destroyed. Further, panels 114 do not have to swing out to open, saving space and making them easy to deal with. Because panels 114 do not swing out to open, they are not subject to the wind and can be left open to drive vehicle 10.

The above detailed description of the preferred embodiments, illustrative examples of structures and materials, and the appended figures are for illustrative purposes only and are not intended to limit the scope and spirit of the invention, and its equivalents, as defined by the appended claims. While the invention is described herein in conjunction with these illustrative embodiments, it will be understood that the invention is not limited to these embodiments. One skilled in the art will recognize that many variations can be made to the invention disclosed in this specification without departing from the scope and spirit of the invention.

What is claimed is:

1. A vehicle comprising:
   a frame;
   a front wheel carried by the frame;
   a rear wheel carried by the frame;
   an enclosure positioned around a riding area of the vehicle and mounted securely on the frame, wherein the enclosure comprises windows;
   a means for entering and exiting the enclosure that can be opened and closed in varying arrays, wherein the means for entering and exiting the enclosure comprises a system of sliding panels contained in a frame and comprising (a) at least one movable crossbar that pivots about an axis and at least one panel, wherein at least one of the panels is movable in at least two directions along the frame so that placement of the at least one panel in select positions within the frame creates openings of different sizes, shapes and locations within the frame, and (b) at least one vertical crossbar, wherein the at least one movable crossbar is pivotably attached to the at least one vertical crossbar, and the at least one panel is movable in a horizontal and vertical direction; and at least one retractable stabilizing member carried by the frame, the at least one retractable stabilizing member having an extended position and a retracted position, wherein the at least one retractable stabilizing member prevents the vehicle from leaning more than a predetermined angular amount from a vertical position when the at least one retractable stabilizing member is in the extended position.

2. The vehicle as claimed in claim 1, wherein one of the at least one retractable stabilizing member is located on each side of the vehicle.

3. The vehicle as claimed in claim 2, wherein the at least one retractable stabilizing member is located proximal to the rear wheel of the vehicle.

4. The vehicle as claimed in claim 1, wherein the at least one retractable stabilizing member prevents the vehicle from tipping when extended, and does not adversely impair the operation of the vehicle or the movement of a rider.

5. The vehicle as claimed in claim 1, wherein the at least one retractable stabilizing member reversibly moves from an upper retracted position distal from a road surface to a lower extended position proximal to the road surface.

6. The vehicle as claimed in claim 5, wherein the at least one retractable stabilizing member is operated automatically.

7. The vehicle as claimed in claim 6, wherein the at least one retractable stabilizing member automatically retracts when the vehicle is moving faster than a preset speed.

8. The vehicle as claimed in claim 7, wherein the at least one retractable stabilizing member automatically retracts when the vehicle is moving faster than 25 miles per hour (40 kph).

9. The vehicle as claimed in claim 7, wherein the at least one retractable stabilizing member automatically retracts when the vehicle is moving faster than 15 miles per hour (24 kph).

10. The vehicle as claimed in claim 7, wherein the at least one retractable stabilizing member automatically retracts when the vehicle is moving faster than 7 miles per hour (11 kph).

11. The vehicle as claimed in claim 7, wherein the at least one retractable stabilizing member automatically retracts when the vehicle is moving faster than a speed preset by a rider.

12. The vehicle as claimed in claim 5, wherein the at least one retractable stabilizing member is operationally attached to the frame via a leg assembly.

13. The vehicle as claimed in claim 12, further comprising one leg assembly for each of the at least one retractable stabilizing member.

14. The vehicle as claimed in claim 13, wherein the leg assembly comprises a strut attached at a proximal end to the vehicle at a pivot point and an axle located at a distal end of the strut and is associated with one of the at least one retractable stabilizing member.

15. The vehicle as claimed in claim 14, wherein the pivot point is a drive shaft on an actuating motor.

16. The vehicle as claimed in claim 15, wherein when the actuating motor is activated to extend the at least one retractable stabilizing member, the actuating motor rotates the strut in a direction so as to move the at least one retractable stabilizing member downward into the extended position.

17. The vehicle as claimed in claim 16, wherein when the actuating motor is activated to retract the at least one retractable stabilizing member, the actuating motor rotates the strut in a direction so as to move the at least one retractable stabilizing member upward into the retracted position shown.

18. The vehicle as claimed in claim 16, further comprising a tension spring to retract the at least one retractable stabilizing member when the actuating motor is deactivated so at to move the at least one retractable stabilizing member upward into the retracted position.

19. The vehicle as claimed in claim 14, further comprising a locking means to hold the at least one retractable stabilizing member in either or both of the extended and retracted positions.

20. The vehicle as claimed in claim 14, wherein the at least one retractable stabilizing member is operated manually.

21. The vehicle as claimed in claim 20, further comprising a control arm attached to the strut at a proximal end and terminating in a handle on a distal end opposite the connection to the strut.

22. The vehicle as claimed in claim 21, wherein the handle is proximal to a rider such that the rider can pull the handle upwards to retract the at least one retractable stabilizing member and push the handle downwards to extend the at least one retractable stabilizing member.

23. The vehicle as claimed in claim 22, wherein the control arm comprises a locking means to hold the at least one retractable stabilizing member in either or both of the extended and retracted positions.

24. The vehicle as claimed in claim 23, further comprising a tension spring to retract the at least one retractable stabilizing member upward into the retracted position.

25. The vehicle as claimed in claim 14, wherein the pivot point is an attachment point on the frame.

26. The vehicle as claimed in claim 25, wherein the leg assembly further comprises a control arm attached to the strut and extending to an actuating motor located on the vehicle.

27. The vehicle as claimed in claim 26, wherein when the actuating motor is activated to extend the at least one retractable stabilizing member, the actuating motor moves the control arm in a direction so as to move the at least one retractable stabilizing member downward into the extended position.

28. The vehicle as claimed in claim 27, wherein when the actuating motor is activated to retract the at least one retractable stabilizing member, the actuating motor moves the control arm in a direction so as to move the at least one retractable stabilizing member upward into the retracted position.

29. The vehicle as claimed in claim 27, further comprising a tension spring to retract the at least one retractable stabilizing member when the actuating motor is deactivated so at to move the at least one retractable stabilizing member upward into the retracted position.

30. The vehicle as claimed in claim 1, wherein the enclosure further comprises at least one safety device selected from the group consisting of bars and safety belts.

31. The vehicle as claimed in claim 1, wherein the enclosure further comprises at least one convenience device selected from the group consisting of headlights, window wipers, storage bins, compartments, audio/video systems, and climate control systems.

32. The vehicle as claimed in claim 1, wherein the at least one retractable stabilizing member when retracted is located inside of the enclosure.

33. The vehicle as claimed in claim 1, wherein the at least one retractable stabilizing member when retracted is located outside of the enclosure.

34. The vehicle as claimed in claim 1, wherein the at least one movable crossbar is lockable in place within the frame.

35. The vehicle as claimed in claim 34, wherein the at least one panel can be slid along the at least one movable crossbar.

36. The vehicle as claimed in claim 35, wherein the movement of the at least one panel is along the at least one movable crossbar.

37. The vehicle as claimed in claim 1, wherein the movement of the at least one panel in one direction creates an opening in the system.

38. The vehicle as claimed in claim 1, wherein the movable bar pivots to a position against a part of the frame so as to create a larger continuous opening through the frame greater than the size of any one of the at least one panel.

39. The vehicle as claimed in claim 1, wherein an electric means is used to move the at least one panel.

40. The vehicle as claimed in claim 1, wherein a first of the least one panel can be slid behind or in front of a second of the at least one panel.

41. the vehicle as claimed in claim 1, wherein all of the at least one panels can be placed in one corner of the frame.

42. A vehicle comprising:
a frame;
a front wheel carried by the frame;
a rear wheel carried by the frame;
an enclosure positioned around the riding area of the vehicle and mounted securely on the frame, wherein the enclosure comprises windows;
a means for entering and exiting the enclosure that can be opened and closed in varying arrays, wherein the means for entering and exiting the enclosure comprises a system of sliding panels contained in a frame and comprising at least one movable crossbar that pivots about an axis and at least one panel, wherein at least one of the panels is movable in at least two directions along the frame so that placement of the at least one panel in select positions within the frame creates openings of different sizes, shapes and locations within the frame; and
at least one retractable stabilizing member carried by the frame, the at least one retractable stabilizing member having an extended position and a retracted position, wherein the at least one retractable stabilizing member prevents the vehicle from leaning more than a predetermined angular amount from a vertical position when the at least one retractable stabilizing member is in the extended position,
wherein an electric means is used to move the at least one panel.

43. The vehicle as claimed in claim 42, wherein one of the at least one retractable stabilizing member is located on each side of the vehicle.

44. The vehicle as claimed in claim 43, wherein the at least one retractable stabilizing member is located proximal to the rear wheel of the vehicle.

45. The vehicle as claimed in claim 43, wherein the at least one retractable stabilizing member automatically retracts when the vehicle is moving faster than a preset speed.

46. A vehicle comprising:
a frame;
a front wheel carried by the frame;
a rear wheel carried by the frame;
an enclosure positioned around the riding area of the vehicle and mounted securely on the frame, wherein the enclosure comprises windows;
a means for entering and exiting the enclosure that can be opened and closed in varying arrays, wherein the means for entering and exiting the enclosure comprises a system of sliding panels contained in a frame and comprising at least one movable crossbar that pivots about an axis and at least one panel, wherein at least one of the panels is movable in at least two directions along the frame so that placement of the at least one panel in select positions within the frame creates openings of different sizes, shapes and locations within the frame; and
at least one retractable stabilizing member carried by the frame, the at least one retractable stabilizing member having an extended position and a retracted position, wherein the at least one retractable stabilizing member prevents the vehicle from leaning more than a predetermined angular amount from a vertical position when the at least one retractable stabilizing member is in the extended position;
wherein a first of the least one panel can be slid behind or in front of a second of the at least one panel.

47. The vehicle as claimed in claim 46, wherein one of the at least one retractable stabilizing member is located on each side of the vehicle.

48. The vehicle as claimed in claim 47, wherein the at least one retractable stabilizing member is located proximal to the rear wheel of the vehicle.

49. The vehicle as claimed in claim 47, wherein the at least one retractable stabilizing member automatically retracts when the vehicle is moving faster than a preset speed.

50. A vehicle comprising:
a frame;
a front wheel carried by the frame;
a rear wheel carried by the frame;
an enclosure positioned around the riding area of the vehicle and mounted securely on the frame, wherein the enclosure comprises windows;
a means for entering and exiting the enclosure that can be opened and closed in varying arrays, wherein the means for entering and exiting the enclosure comprises a system of sliding panels contained in a frame and comprising at least one movable crossbar that pivots about an axis and at least one panel, wherein at least one of the panels is movable in at least two directions along the frame so that placement of the at least one panel in select positions within the frame creates openings of different sizes, shapes and locations within the frame; and
at least one retractable stabilizing member carried by the frame, the at least one retractable stabilizing member having an extended position and a retracted position, wherein the at least one retractable stabilizing member prevents the vehicle from leaning more than a predetermined angular amount from a vertical position when the at least one retractable stabilizing member is in the extended position;
wherein all of the at least one panels can be placed in one corner of the frame.

51. The vehicle as claimed in claim 50, wherein one of the at least one retractable stabilizing member is located on each side of the vehicle.

52. The vehicle as claimed in claim 51, wherein the at least one retractable stabilizing member is located proximal to the rear wheel of the vehicle.

53. The vehicle as claimed in claim 51, wherein the at least one retractable stabilizing member automatically retracts when the vehicle is moving faster than a preset speed.

* * * * *